US010562564B2

(12) United States Patent
Ikari et al.

(10) Patent No.: US 10,562,564 B2
(45) Date of Patent: *Feb. 18, 2020

(54) WORK VEHICLE

(71) Applicant: KOMATSU LTD., Tokyo (JP)

(72) Inventors: Masanori Ikari, Tokyo (JP);
Masanobu Nakabayashi, Tokyo (JP);
Yuita Takenaka, Tokyo (JP);
Masahiko Hamaguchi, Tokyo (JP);
Jun Itou, Tokyo (JP); Kenichi Muramoto, Tokyo (JP)

(73) Assignee: KOMATSU LTD., Tokyo (JP)

( * ) Notice: Subject to any disclaimer, the term of this patent is extended or adjusted under 35 U.S.C. 154(b) by 225 days.

This patent is subject to a terminal disclaimer.

(21) Appl. No.: 15/556,359

(22) PCT Filed: Oct. 26, 2016

(86) PCT No.: PCT/JP2016/081736
§ 371 (c)(1),
(2) Date: Sep. 7, 2017

(87) PCT Pub. No.: WO2017/073618
PCT Pub. Date: May 4, 2017

(65) Prior Publication Data
US 2018/0105202 A1     Apr. 19, 2018

(30) Foreign Application Priority Data

Oct. 30, 2015  (JP) .................................. 2015-213868

(51) Int. Cl.
*B62D 5/06*         (2006.01)
*B62D 5/065*        (2006.01)
(Continued)

(52) U.S. Cl.
CPC ............. *B62D 5/065* (2013.01); *B62D 5/006* (2013.01); *B62D 5/04* (2013.01); *B62D 5/0409* (2013.01);
(Continued)

(58) Field of Classification Search
CPC ...... B62D 5/065; B62D 5/006; B62D 5/0409; B62D 5/0463; B62D 5/06; B62D 5/0832
See application file for complete search history.

(56) References Cited

U.S. PATENT DOCUMENTS 4,800,975 A    1/1989  Oshita et al.
6,179,082 B1*  1/2001  Ikari ...................... B62D 5/06
                                                    180/418

(Continued)

FOREIGN PATENT DOCUMENTS

CN    101003283 A    7/2007
CN    101568460 A    10/2009
(Continued)

OTHER PUBLICATIONS

The International Search Report for the corresponding international application No. PCT/JP2016/081736, dated Jan. 24, 2017.
(Continued)

*Primary Examiner* — Kevin Hurley
*Assistant Examiner* — Marlon A Arce
(74) *Attorney, Agent, or Firm* — Global IP Counselors, LLP

(57) ABSTRACT

A work vehicle is articulated with a front frame and a rear frame linked to the front frame. The work vehicle includes a hydraulic actuator, a control valve, an operation member and a force imparting component. The hydraulic actuator is configured to be hydraulically driven to change a steering angle of the front frame with respect to the rear frame. The control valve is configured to control flow of fluid supplied (Continued)

to the hydraulic actuator. The operation member is linked to the control valve and configured to be operated by an operator. The force imparting component is configured to impart an assist force or a counterforce to an operation of the operation member.

12 Claims, 11 Drawing Sheets

(51) Int. Cl.
*B62D 12/00* (2006.01)
*B62D 5/04* (2006.01)
*B62D 5/09* (2006.01)
*B62D 5/083* (2006.01)
*B62D 5/00* (2006.01)
*B62D 5/24* (2006.01)

(52) U.S. Cl.
CPC ............ *B62D 5/0463* (2013.01); *B62D 5/06* (2013.01); *B62D 5/0832* (2013.01); *B62D 5/09* (2013.01); *B62D 12/00* (2013.01); *B62D 5/24* (2013.01)

(56) References Cited

U.S. PATENT DOCUMENTS

| | | | |
|---|---|---|---|
| 6,202,501 B1 | 3/2001 | Ikari | |
| 6,389,343 B1 | 5/2002 | Hefner et al. | |
| 7,610,989 B2* | 11/2009 | Vigholm | B62D 1/22 |
| | | | 180/418 |
| 9,085,319 B2* | 7/2015 | Imanishi | B62D 1/22 |
| 10,266,200 B2* | 4/2019 | Takenaka | B62D 5/06 |
| 2002/0092698 A1* | 7/2002 | Juul | B62D 5/093 |
| | | | 180/419 |
| 2007/0168093 A1 | 7/2007 | Nishiyama | |
| 2008/0041655 A1 | 2/2008 | Breiner et al. | |
| 2008/0162000 A1 | 7/2008 | Dattilo et al. | |
| 2010/0307857 A1 | 12/2010 | Shinagawa | |
| 2011/0029199 A1 | 2/2011 | Saito et al. | |
| 2012/0217083 A1 | 8/2012 | Brickner | |
| 2014/0214278 A1 | 7/2014 | Kuipers et al. | |
| 2015/0210310 A1 | 7/2015 | Akatsuka et al. | |

FOREIGN PATENT DOCUMENTS

| | | |
|---|---|---|
| CN | 101722980 A | 6/2010 |
| CN | 102530055 A | 7/2012 |
| CN | 101959741 B | 1/2013 |
| CN | 104520167 A | 4/2015 |
| DE | 3537024 C2 | 1/1991 |
| DE | 10 2012 107 595 A1 | 2/2014 |
| JP | 11-105723 A | 4/1999 |
| JP | 11-321664 A | 11/1999 |
| JP | 2000-313350 A | 11/2000 |
| JP | 2002-160652 A | 6/2002 |
| JP | 2002-160660 A | 6/2002 |
| JP | 2005-306184 A | 11/2005 |
| JP | 2008-296681 A | 12/2008 |
| JP | 2015-113039 A | 6/2015 |
| WO | 2008088515 A1 | 7/2008 |
| WO | 2009/130866 A1 | 10/2009 |
| WO | 2012118709 A2 | 9/2012 |
| WO | 2014116441 A1 | 7/2014 |

OTHER PUBLICATIONS

The extended European search report for the corresponding European application No. 16859847.2, dated Sep. 25, 2018.
The Office Action for the corresponding Chinese application No. 201680013271.8, dated Jan. 11, 2019.

* cited by examiner ced.

WORK VEHICLE

CROSS-REFERENCE TO RELATED APPLICATIONS

This U.S. National stage application claims priority under 35 U.S.C. § 119(a) to Japanese Patent Application No. 2015-213868, filed in Japan on Oct. 30, 2015, the entire contents of which are hereby incorporated herein by reference.

BACKGROUND

Field of the Invention

The present invention relates to a work vehicle.

An articulated work vehicle has been disclosed with a configuration in which the steering angle is changed by controlling the flow of fluid supplied to a hydraulic actuator disposed from the front frame to the rear frame (see Japanese Laid-Open Patent Application Nos. H11-105723 and H11-321664, for example).

With the work vehicles in Japanese Laid-Open Patent Application Nos. H11-105723 and H11-321664, when the operator moves the joystick lever, the port of a pilot valve is either opened or closed, and the pilot pressure is changed. The flow of fluid supplied from the steering valve to the hydraulic actuator is adjusted according to the changed pilot pressure, which changes the steering angle of the work vehicle.

Since the steering angle is changed hydraulically, the operator can change the steering angle merely by exerting on the joystick lever a light pressure that is necessary for changing the open or closed state of the port of the pilot valve.

SUMMARY

With the work vehicles in the above-mentioned Japanese Laid-Open Patent Application Nos. H11-105723 and H11-321664, however, the tactile sensation felt by the operator was determined by the force required to change the open or closed state of the pilot valve, so even if the speed of the work vehicle was changed, for example, the tactile sensation of the operation member felt by the operator was the same. That is, it was difficult for the operator to perform operations instinctively according to the state of the work vehicle.

In light of the above problem encountered with a conventional work vehicle, it is an object of the present invention to provide a work vehicle with which the operator has improved tactile sensation.

The work vehicle pertaining to the first aspect is an articulated work vehicle in which a front frame and a rear frame are linked, comprising a hydraulic actuator, a control valve, an operation member, and a force imparting component. The hydraulic actuator is hydraulically driven and changes the steering angle of the front frame with respect to the rear frame. The control valve controls the flow of fluid supplied to the hydraulic actuator. The operation member is linked to the control valve and is operated by an operator. The force imparting component imparts an assist force or a counterforce to the operation of the operation member.

The force necessary for operating the operating member is mainly determined by the control valve, but the tactile feel can be changed to match the state of the work vehicle by imparting an assist force or a counterforce to the operation of the operating member with the force imparting component.

For example, when moving the work vehicle at low speed, operability can be improved by imparting an assist force to the operating member to reduce the force need to operate the operating member. On the other hand, when the travel speed of the work vehicle is changed from a low speed to a high speed, travel stability can be improved by imparting a counterforce to the operating member and increasing the force needed to operate the operating member.

Thus, the tactile sensation felt by the operator can be improved by suitably changing the force required to operate the operating member to match the travel state of the work vehicle.

The work vehicle pertaining to the second aspect is the work vehicle pertaining to the first aspect, further comprising a link. This link links the operation member and the control valve. The force imparting component further has a transmission mechanism that transmits the assist force or counterforce to the link.

This allows the force of the force imparting component to be transmitted to the link that links the operating member and the control valve, and allows the force needed to operate the operating member to be changed.

The work vehicle pertaining to the third aspect is the work vehicle pertaining to the first or second aspect, wherein the force imparting component has an electric motor as its drive source.

This allows the force produced by the electric motor to be used to impart an assist force or a counterforce to the operation of the operation member.

The work vehicle pertaining to the fourth aspect is the work vehicle pertaining to the third aspect, further comprising a torque sensor and a controller. The torque sensor senses the torque produced by operation of the operation member. The controller controls the electric motor on the basis of the sensed value of the torque sensor.

Consequently, force can be imparted according to the torque exerted on the operating member by the operator. For example, the amount of force imparted can be controlled so that the assist force imparted by the force imparting component is increased when the torque exerted on the operating member by the operator is high, and the assist force is decreased when the torque is low.

The work vehicle pertaining to the fifth aspect is the work vehicle pertaining to the first aspect, wherein the control valve has a first input member, a second input member, and a biasing component. The first input member is linked to the operation member and is displaced according to the amount of operation of the operation member. The second input member is displaced according to the steering angle. The biasing component biases the first input member to a neutral position at which the amount of displacement of the first input member matches the amount of displacement of the second input member.

Consequently, after the operation member has been operated, the steering angle changes according to the operation member, and the control valve goes into the neutral position when the steering angle matches the amount of operation of the operation member.

Also, the biasing component is thus provided to the control valve, and the operator operates the operation member with an operating force against the biasing force produced by the biasing component. An assist force or counterforce can be imparted to the operation against this biasing force.

The work vehicle pertaining to the sixth aspect is the work vehicle pertaining to the fifth aspect, further comprising a controller. The controller controls the force imparting component according to the difference between the amount of displacement of the first input member and the amount of displacement of the second input member.

Consequently, the force imparting component can be controlled according to the difference between the operation member and the steering angle.

The work vehicle pertaining to the seventh aspect is the work vehicle pertaining to the fifth aspect, further comprising a steering valve. The steering valve adjusts the flow of fluid supplied to the hydraulic actuator on the basis of a pilot pressure inputted from the control valve. The control valve controls the flow of fluid supplied from the steering valve to the hydraulic actuator by adjusting the pilot pressure.

Consequently, the pilot pressure is adjusted by operator operation, the amount of fluid supplied from the steering valve to the hydraulic actuator is controlled, and the steering angle of the front frame with respect to the rear frame is changed.

The work vehicle pertaining to the eighth aspect is the work vehicle pertaining to any of the first to seventh aspects, wherein the operation member is a joystick lever.

Consequently, the operator can change the steering angle by operating the joystick lever.

Also, when V shape loading is performed by a wheel loader (an example of a work vehicle), the amount of operation when using a joystick lever will be less than with a steering wheel, which reduces the burden on the operator.

The present invention according to one or more of the above aspects provides a work vehicle with which the tactile sensation experienced by the operator can be improved.

DETAILED DESCRIPTION OF EMBODIMENT(S)

A wheel loader in an embodiment pertaining to the present invention will now be described through reference to the drawings.

Embodiment 1

1. Configuration
1-1. Overview of Wheel Loader Configuration

Figure 1:
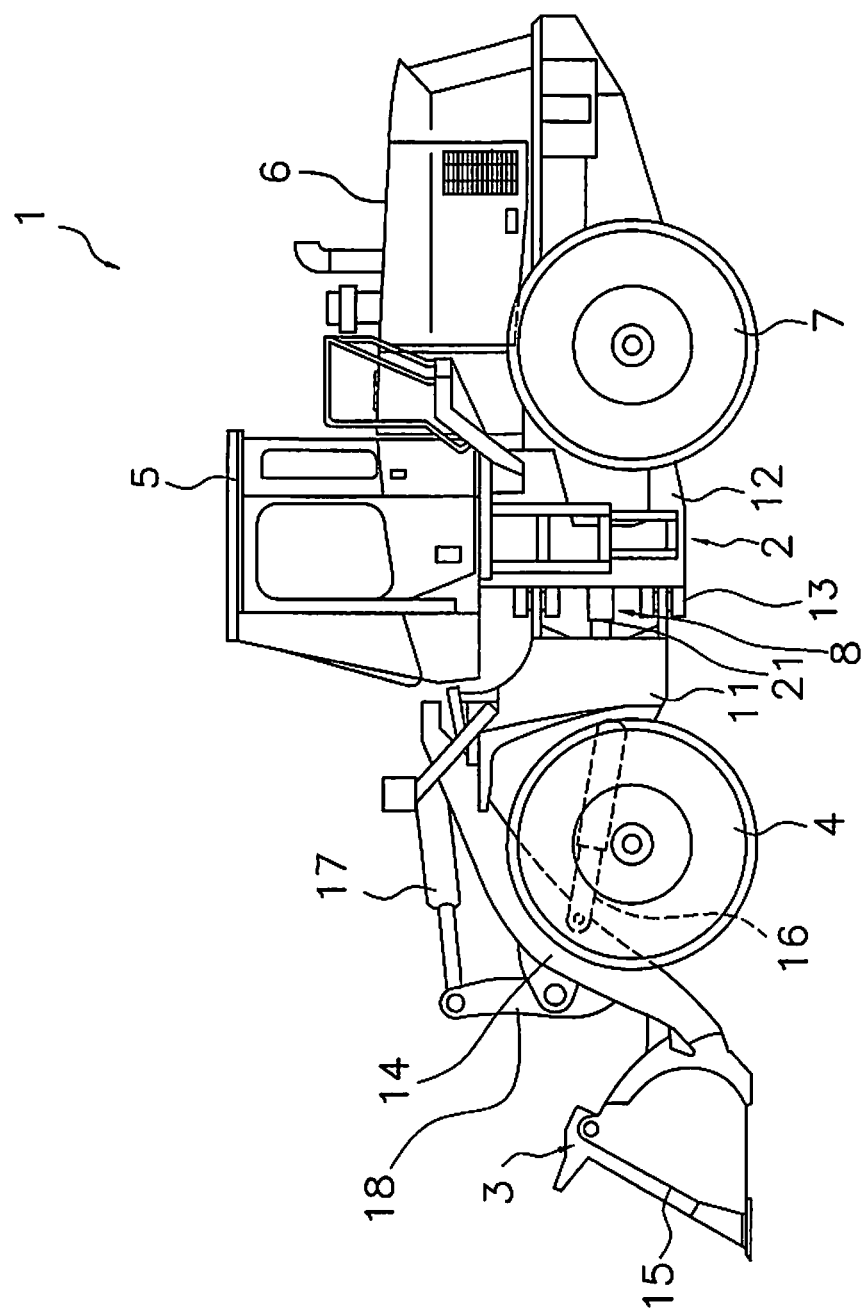
FIG. 1 is a side view of a wheel loader in an embodiment pertaining to the present invention.

FIG. 1 is a simplified diagram of the configuration of a wheel loader 1 in this embodiment. The wheel loader 1 in this embodiment comprises a body frame 2, a work implement 3, a pair of front tires 4, a cab 5, an engine compartment 6, a pair of rear tires 7, and a steering operating device 8 (see FIG. 2, discussed below).

The wheel loader 1 performs earth loading and other such work with the work implement 3.

The body frame 2 is what is known as an articulated type, and has a front frame 11, a rear frame 12, and a linking shaft 13. The front frame 11 is disposed in front of the rear frame 12. The linking shaft 13 is provided in the center of the vehicle width direction, and pivotably links the front frame 11 to the rear frame 12. The front tires 4 are attached on the left and right sides of the front frame 11. The rear tires 7 are attached on the left and right sides of the rear frame 12.

The work implement 3 is driven by hydraulic fluid from a work implement pump (not shown). The work implement 3 has a boom 14, a bucket 15, a lift cylinder 16, and a bucket cylinder 17. The boom 14 is mounted on the front frame 11. The bucket 15 is attached to the distal end of the boom 14.

The lift cylinder 16 and the bucket cylinder 17 are hydraulic cylinders. One end of the lift cylinder 16 is attached to the front frame 11, and the other end of the lift cylinder 16 is attached to the boom 14. The lift cylinder 16 telescopes in and out to pivot the boom 14 up and down. One end of the bucket cylinder 17 is attached to the front frame 11, and the other end of the bucket cylinder 17 is attached to the bucket 15 via a bell crank 18. The bucket cylinder 17 telescopes in and out to pivot the bucket 15 up and down.

The cab 5 is mounted on the rear frame 12, inside of which are disposed a steering wheel or joystick lever 24 (discussed below; see FIG. 2) for steering, a lever for controlling the work implement 3, various display devices, and so forth. The engine compartment 6 is disposed on the rear frame 12 to the rear of the cab 5, and houses an engine.

The steering operating device 8 will be discussed in detail below, but has steering cylinders 21 and 22. The amount of fluid supplied to the steering cylinders 21 and 22 is varied to change the steering angle of the front frame 11 with respect to the rear frame 12 and to change the travel direction of the wheel loader 1.

Steering Operation Device

Figure 2:
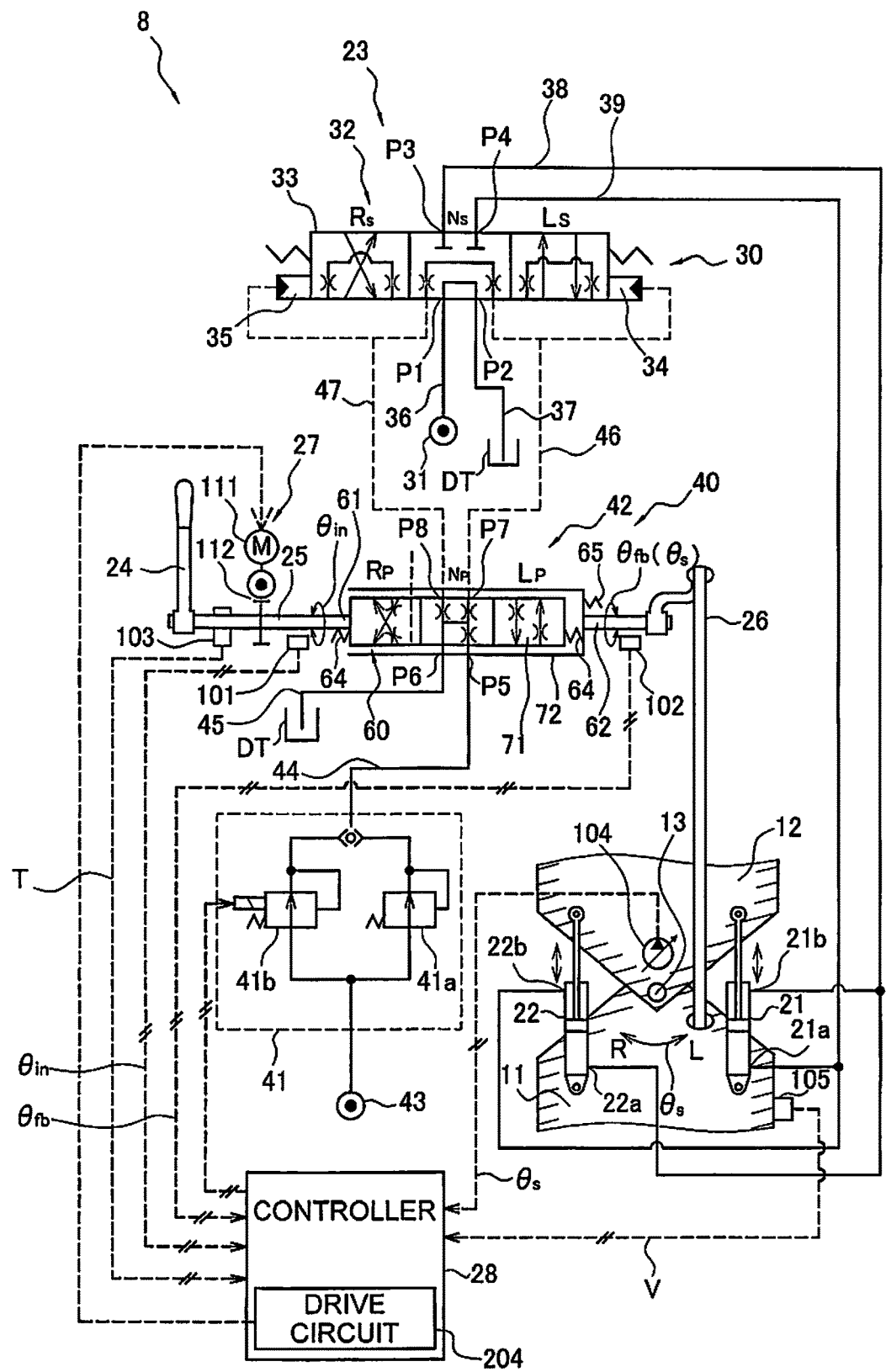
FIG. 2 is a hydraulic circuit diagram showing the configuration of a steering operation device of the wheel loader in FIG. 1.

FIG. 2 is a hydraulic circuit diagram of the configuration of the steering operation device 8. The steering operation device 8 in this embodiment mainly has a pair of steering cylinders 21 and 22, a steering hydraulic circuit 23, a joystick lever 24, a link 25, a linking mechanism 26, a force imparting component 27, and a controller 28.

1-2-1. Steering Cylinders

The steering cylinders 21 and 22 are driven hydraulically. The steering cylinders 21 and 22 are disposed side by side on the left and right sides in the vehicle width direction, flanking a linking shaft 13. The steering cylinder 21 is disposed on the left side of the linking shaft 13 (see FIG. 1). The steering cylinder 22 is disposed on the right side of the linking shaft 13. The steering cylinders 21 and 22 are attached at one end to the front frame 11, and at the other end to the rear frame 12.

The steering cylinder 21 is provided with an extension port 21a and a contraction port 21b, and the steering cylinder 22 is provided with an extension port 22a and a contraction port 22b.

When fluid is supplied to the extension port 21a of the steering cylinder 21 and the contraction port 22b of the steering cylinder 22 and fluid is discharged from the contraction port 21b of the steering cylinder 21 and the extension port 22a of the steering cylinder 22, the steering cylinder 21 extends and the steering cylinder 22 contracts. As a result, the steering angle θs changes and the vehicle turns to the right. When fluid is supplied to the contraction port 21b of the steering cylinder 21 and the extension port 22a of the steering cylinder 22 and fluid is discharged from the extension port 21a of the steering cylinder 21 and the contraction port 22b of the steering cylinder 22, the steering cylinder 21 contracts and the steering cylinder 22 extends. As a result, the steering angle θs changes and the vehicle turns to the left.

A steering angle sensor 104 for detecting a steering angle θs is provided near the linking shaft 13 disposed arranged between the steering cylinders 21 and 22. The steering angle sensor 104 is constituted by a potentiometer, for example, and the sensed steering angle θs is sent to the controller 28 as a sensing signal.

The steering cylinder 21 is provided with a cylinder stroke sensor 106 for detecting the stroke of the cylinder, and the steering cylinder 22 is provided with a cylinder stroke sensor 107 for detecting the stroke of the cylinder. Sensing values from these cylinder stroke sensors 106 and 107 may be sent to the controller 28 to find the steering angle θs.

1-2-2. Steering Hydraulic Circuit

The steering hydraulic circuit 23 is a hydraulic circuit for adjusting the flow of fluid supplied to the steering cylinders 21 and 22. The steering hydraulic circuit 23 has a main hydraulic circuit 30 and a pilot hydraulic circuit 40.

(a) Main Hydraulic Path

The main hydraulic circuit 30 is a circuit that supplies fluid from a main hydraulic pressure source 31 to the steering cylinders 21 and 22, and has a steering valve 32. The main hydraulic pressure source 31 is made up of a hydraulic pump, a relief valve, and the like.

The steering valve 32 is a flow control valve that adjusts the flow of the fluid supplied to the steering cylinders 21 and 22 according to the inputted pilot pressure. The steering valve 32 has a main pump port P1, a main drain port P2, a first steering port P3, and a second steering port P4. The main pump port P1 is connected to the main hydraulic pressure source 31 via a main hydraulic line 36. The main drain port P2 is connected to a drain tank DT that collects fluid via the main drain line 37. The first steering port P3 is connected to the contraction port 21b of the steering cylinder 21 and the extension port 22a of the steering cylinder 22 via a first steering line 38. The second steering port P4 is connected to the extension port 21a of the steering cylinder 21 and the contraction port 22b of the steering cylinder 22 via a second steering line 39.

Also, the steering valve 32 has a valve body 33 that can move between a neutral position Ns, a left steering position Ls, and a right steering position Rs. When the valve body 33 is in the neutral position Ns, the main pump port P1 communicates with the main drain port P2. In this case, the first steering port P3 and the second steering port P4 are not in communication. When the valve body 33 is in the left steering position Ls, the main pump port P1 communicates with the first steering port P3, and the main drain port P2 communicates with the second steering port P4. When the valve body 33 is in the right steering position Rs, the main pump port P1 communicates with the second steering port P4, and the main drain port P2 communicates with the first steering port P3.

The steering valve 32 has a first pilot chamber 34 and a second pilot chamber 35. In a state in which no pilot pressure is supplied to the first pilot chamber 34 or the second pilot chamber 35, and the same pilot pressure is supplied to the first pilot chamber 34 and the second pilot chamber 35, the valve body 33 is in the neutral position Ns. In a state in which the pilot pressure is supplied only to the first pilot chamber 34, the valve body 33 is located in the left steering position Ls. In a state in which the pilot pressure is supplied only to the second pilot chamber 35, the valve body 33 is located in the right steering position Rs. When the valve body 33 is located in the left steering position Ls and the right steering position Rs, the steering valve 32 changes the opening surface area through which the fluid from the main hydraulic pressure source 31 passes according to the supplied pilot pressure. Consequently, the steering valve 32 controls the flow of fluid supplied to the steering cylinder 21 or the steering cylinder 22 according to the pilot pressure.

(b) Pilot Hydraulic Circuit

The pilot hydraulic circuit 40 is a circuit for supplying the fluid from the pilot hydraulic pressure source 43 to the first pilot chamber 34 and the second pilot chamber 35 of the steering valve 32.

The pilot hydraulic circuit 40 has a variable pressure reducer 41 and a pilot valve 42.

(i) Variable Pressure Reducer

The variable pressure reducer 41 reduces and adjusts the hydraulic pressure sent from the pilot hydraulic pressure source 43 to the pilot valve 42. The variable pressure reducer 41 incorporates an electromagnetic pressure reducing valve, and receives a command signal from the controller 28 to control the hydraulic pressure.

(ii) Pilot Valve

The pilot valve 42 is a rotary valve that adjusts the pilot pressure inputted from the pilot hydraulic pressure source 43 to the steering valve 32.

Overview of Pilot Valve Configuration

The rotary pilot valve 42 has a pilot pump port P5, a pilot drain port P6, a first pilot port P7, and a second pilot port P8. The pilot pump port P5 is connected to the variable pressure reducer 41 via a pilot hydraulic line 44, and the variable pressure reducer 41 is connected to the pilot hydraulic pressure source 43. The pilot drain port P6 is connected to the drain tank DT for recovering fluid via a pilot drain line 45. The first pilot port P7 is connected to the first pilot chamber 34 of the steering valve 32 via a first pilot line 46. The second pilot port P8 is connected to the second pilot chamber 35 of the steering valve 32 via a second pilot line 47.

The pilot valve 42 has a valve body component 60 that includes an operation spool 71 and an operation sleeve 72. With the operation sleeve 72 as a reference, the operation spool 71 can move between a neutral position Np, a left pilot position Lp, and a right pilot position Rp.

When the operation spool 71 is in the neutral position Np with respect to the operation sleeve 72, the pilot pump port P5, the pilot drain port P6, the first pilot port P7, and the second pilot port P8 communicate with each other. When the operation spool 71 in the left pilot position Lp with respect to the operation sleeve 72, the pilot pump port P5 communicates with the first pilot port P7, and the pilot drain port P6 communicates with the second pilot port P8. Also, when the operation spool 71 is in the right pilot position Rp with respect to the operation sleeve 72, the pilot pump port P5 communicates with the second pilot port P8, and the pilot drain port P6 communicates with the first pilot port P7.

Figure 3:
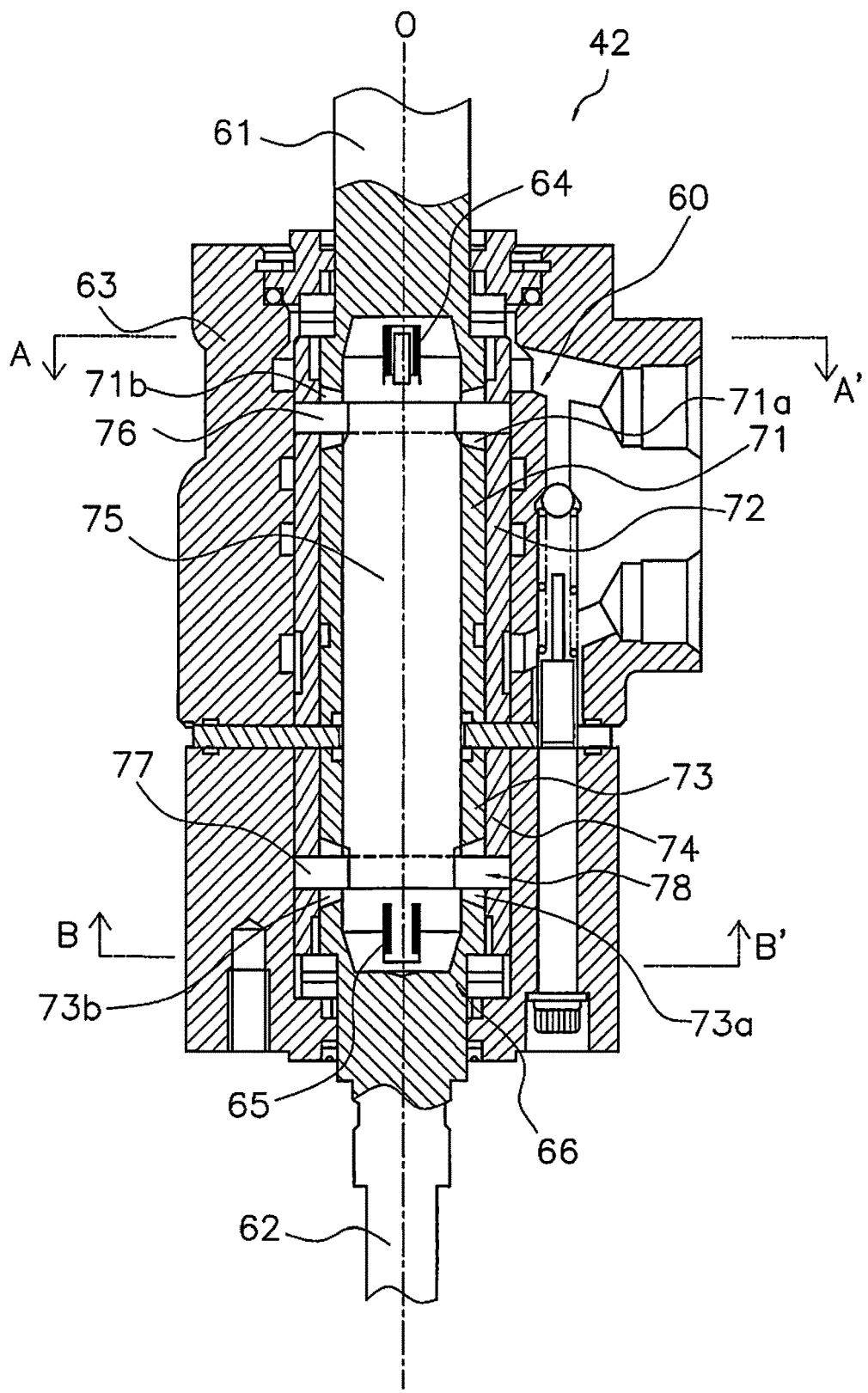
FIG. 3 is a cross section of the configuration of the pilot valve in FIG. 2.

FIG. 3 is a cross section of the configuration of the pilot valve 42.

The pilot valve 42 mainly has the valve body component 60, an operation input shaft 61, a feedback input shaft 62, a housing 63, a first spring 64, a second spring 65, and a feedback component 66.

Operation Input Shaft

The operation input shaft 61 is provided so as to be rotatable around its center axis O, and is inserted into the housing 63. The operation input shaft 61 is linked to the joystick lever 24 (discussed below) via the link 25. The operation input shaft 61 rotates at the same rotational angle as the rotational angle θin to the left and right of the joystick lever 24.

Feedback Input Shaft

The feedback input shaft 62 is disposed coaxially with the operation input shaft 61, and is provided so as to be rotatable around the center axis O. The feedback input shaft 62 is inserted into the housing 63 so as to be opposite the operation input shaft 61. The feedback input shaft 62 is linked to the front frame 11 via a linking mechanism 26 (discussed below) and rotates at the same rotational angle as the steering angle θs of the front frame 11 with respect to the rear frame 12.

Housing

A substantially cylindrical space is formed in the housing 63, and the operation input shaft 61 and the feedback input shaft 62 are inserted as mentioned above. The housing 63 accommodates the valve body component 60 and the feedback component 66, and the pilot pump port P5, the pilot drain port P6, the first pilot port P7, and the second pilot port P8 are formed.

Valve Body Component

The valve body component 60 has the operation spool 71 and the operation sleeve 72, and moves between the neutral position Np, the left pilot position Lp, and the right pilot position Rp when the operation spool 71 rotates with respect to the operation sleeve 72.

The operation spool 71 is substantially cylindrical in shape and disposed coaxially with the operation input shaft 61, and is connected to the operation input shaft 61. The joystick lever 24 is connected to the operation input shaft 61 via the link 25 (discussed below). When the operator operates the joystick lever 24 to the right side by the rotational angle θin, the operation input shaft 61 and the operation spool 71 also rotate to the right around the center axis O by the rotational angle θin. Slits 71a and 71b are formed in the operation spool 71 near the operation input shaft 61 along the peripheral direction at two positions opposite each other so as to sandwich the center axis O in between.

The operation sleeve 72 has a substantially cylindrical shape and is disposed on the outside of the operation spool 71 and inside the housing 63 so as to be rotatable with respect to the operation spool 71 and the housing 63.

In this Specification, the terms right rotation and left rotation indicate the rotation direction when viewed from above.

First Spring

The first spring 64 is inserted between the operation spool 71 and the operation sleeve 72, which are rotatable with respect to each other, and generates a counterforce corresponding to the difference in rotational angle between the two.

Figure 4:
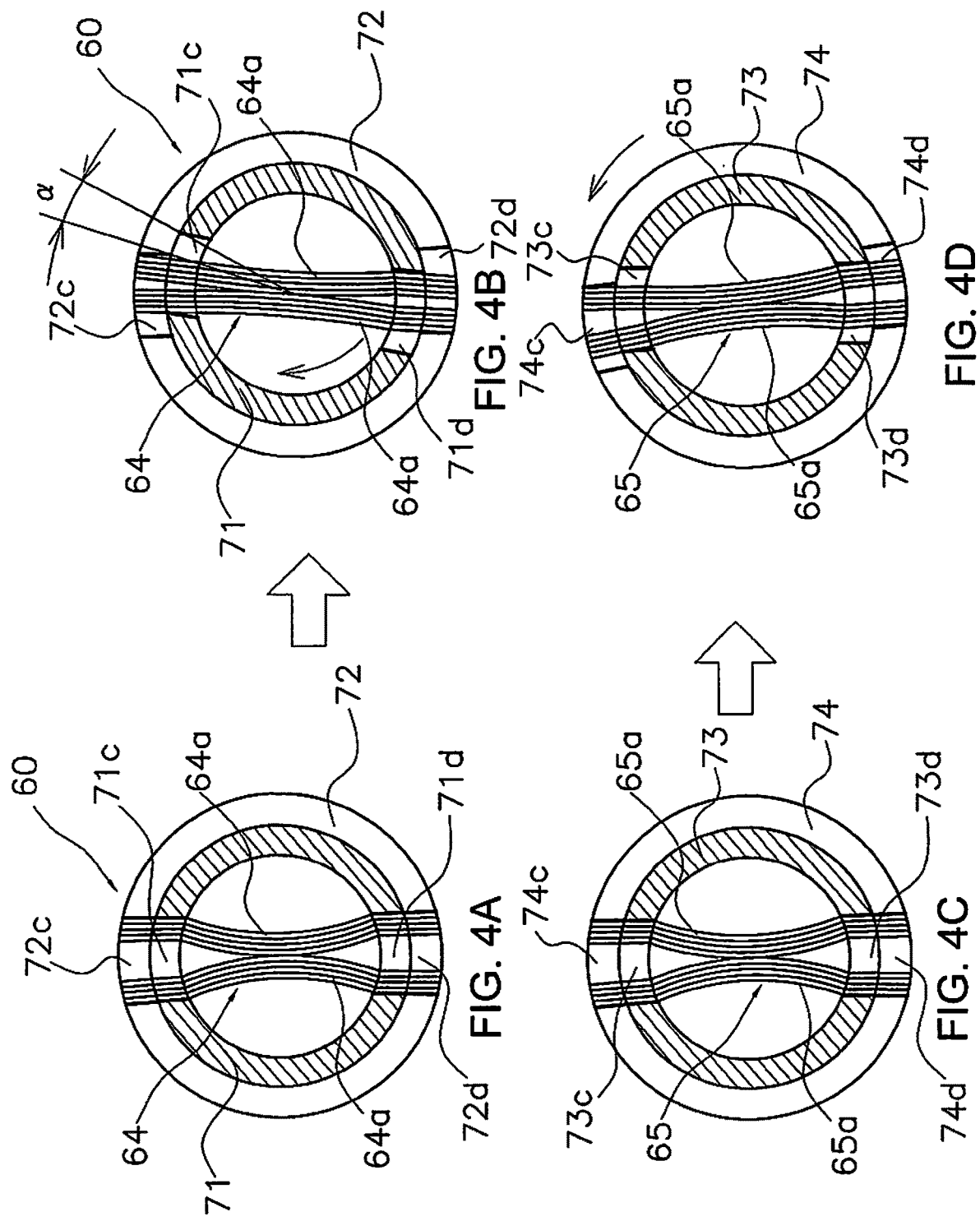
FIGS. 4A and 4B are cross sections along the AA' line in FIG. 3, and FIGS. 4C and 4D are cross sections along the BB' line in FIG. 3.

FIG. 4A is a cross section along the AA' line perpendicular to the center axis O. As shown in FIG. 4A, rectangular holes 71c and 71d are provided to the operation spool 71 on diametrically opposed walls. Rectangular grooves 72c and 72d are formed in the diametrically opposed walls at the end of the operation sleeve 72 on the operation input shaft 61 side. The first spring 64 is formed by two leaf spring units 64a in which a plurality of convex leaf springs are stacked. The two leaf spring units Ma are disposed so that their convex parts are opposite each other so as to form an X shape as in FIG. 4A. The two leaf spring units 64a go through the holes 71c and 71d in the operation spool 71, and both ends thereof go into the grooves 72c and 72d of the operation sleeve 72. The operation spool 71 and the operation sleeve 72 are thus linked by the first spring 64.

As shown in FIG. 4A, a state in which the positions of the hole 71c and the groove 72c in the peripheral direction substantially coincide, and the positions of the hole 71d and the groove 72d in the peripheral direction substantially coincide, is a state in which the valve body component 60 is in the neutral position Np.

Also, when the joystick lever 24 is operated, the operation spool 71 rotates with respect to the operation sleeve 72 as shown in FIG. 4B, and the operation spool 71 moves with respect to the operation sleeve 72 to the left pilot position Lp or the right pilot position Rp. When the joystick lever 24 is rotated to the right, the operation spool 71 rotates to the right with respect to the operation sleeve 72 and moves to the right pilot position Rp. When the joystick lever 24 is rotated to the left, the operation spool 71 rotates to the left with respect to the operation sleeve 72 and moves to the left pilot position Lp.

In this movement, since the operator moves the joystick lever 24 against the spring force of the first spring 64, a lever counterforce is generated in the joystick lever 24. In other words, the first spring 64 biases the operation spool 71 to the neutral position Np with respect to the operation sleeve 72.

Feedback Component

Meanwhile, the feedback component 66 feeds back the steering angle θs of the front frame 11 with respect to the rear frame 12 to the valve body component 60. The feedback component 66 mainly has a feedback spool 73, a feedback sleeve 74, a drive shaft 75, a first center pin 76, and a restrictor 78.

The drive shaft 75 is disposed between the operation input shaft 61 and the feedback input shaft 62, coaxially with the operation input shaft 61 and the feedback input shaft 62 (center axis O). The drive shaft 75 is disposed inside the operation spool 71. The first center pin 76 is disposed perpendicular to the center axis O at the end of the drive shaft 75 on the operation input shaft 61 side. Both ends of the first center pin 76 go through the slits 71a and 71b and are fixed to the operation sleeve 72. As will be described in detail below, the first center pin 76 and the slits 71a and 71b restrict the rotational angle of the operation spool 71 with respect to the operation sleeve 72 to an angle within a predetermined range. Since the first center pin 76 is fixed to the operation sleeve 72 and the drive shaft 75, the operation sleeve 72 that is integrated with the drive shaft 75 also rotates when the drive shaft 75 is rotated.

The feedback spool 73 has a substantially cylindrical shape and is disposed coaxially with the feedback input shaft 62, and is linked to the feedback input shaft 62. Slits 73a and 73b are formed near the feedback input shaft 62 of the feedback spool 73 along the peripheral direction at two locations that are opposite each other and sandwich the central axis O in between. The drive shaft 75 is disposed inside the feedback spool 73. The feedback input shaft 62 is linked to the front frame 11 via the linking mechanism 26 (discussed below), and when the front frame 11 rotates to right by the steering angle θs with respect to the rear frame 12, the feedback input shaft 62 and the feedback spool 73 also rotate to the right by the same rotational angle θs as the steering angle θs.

The feedback sleeve 74 is substantially cylindrical in shape, and is disposed outside of the feedback spool 73 and inside the housing 63, rotatably with respect to the feedback spool 73 and the housing 63.

The restrictor 78 restricts the rotation of the feedback sleeve 74 with respect to the feedback spool 73 to an angle within a predetermined range. The restrictor 78 is made up of a second center pin 77 and walls 73ae and 73be (discussed below; see FIG. 7) at both ends in the peripheral direction of the slits 73a and 73b.

The second center pin 77 is disposed perpendicular to the center axis O, at the end of the drive shaft 75 on the feedback input shaft 62 side. Both ends of the second center pin 77 are fixed to the feedback sleeve 74 through the slits 73a and 73b. The second center pin 77 and the slits 73a and 73b restrict the rotation of the feedback sleeve 74 with respect to the feedback spool 73 to an angle within a predetermined range. Also, since the second center pin 77 is fixed to the feedback sleeve 74 and the drive shaft 75, when the feedback sleeve 74 rotates, the drive shaft 75 that is integrated with the feedback sleeve 74 also rotates. The rotation of the drive shaft 75 causes the operation sleeve 72 that is fixed to the drive shaft 75 by the first center pin 76 to rotate.

Second Spring

The second spring 65 is inserted between the feedback spool 73 and the feedback sleeve 74, which are able to rotate relative to each other, and generates a counterforce corresponding to the rotational difference between the two. FIG. 4C is cross section along the BB' line in FIG. 3.

As shown in FIG. 4C, square holes 73c and 73d are provided to the diametrically opposed walls of the feedback spool 73.

Also, rectangular grooves 74c and 74d are formed in the diametrically opposed walls at the end of the feedback sleeve 74 on the feedback input shaft 62 side. The second spring 65 is formed from two leaf spring units 65a in which a plurality of convex leaf springs are stacked. The two leaf spring units 65a are disposed so that their convex parts are opposite each other so as to form an X shape as in FIG. 4C. The two leaf spring units 65a go through the holes 73c and 73d in the feedback spool 73, and both ends thereof go into the grooves 74c and 74d of the feedback sleeve 74. The feedback spool 73 and the feedback sleeve 74 are thus linked by the second spring 65. In the state in FIG. 4C, the hole 73c and the groove 74c coincide in the peripheral direction, and the hole 73d and the groove 74d coincide in the peripheral direction. The feedback sleeve 74 is biased by the second spring 65 so that the positions of the grooves 74c and 74d in the peripheral direction match the positions of the holes 73c and 73d of the feedback spool 73 in the peripheral direction.

The first spring 64 bends until the operation spool 71 is restricted with respect to the operation sleeve 72, but the second spring 65 is set so that it begins to bend when subjected to a force that is greater than the counterforce produced by the first spring 64 until the operation spool 71 is restricted.

Figure 7:
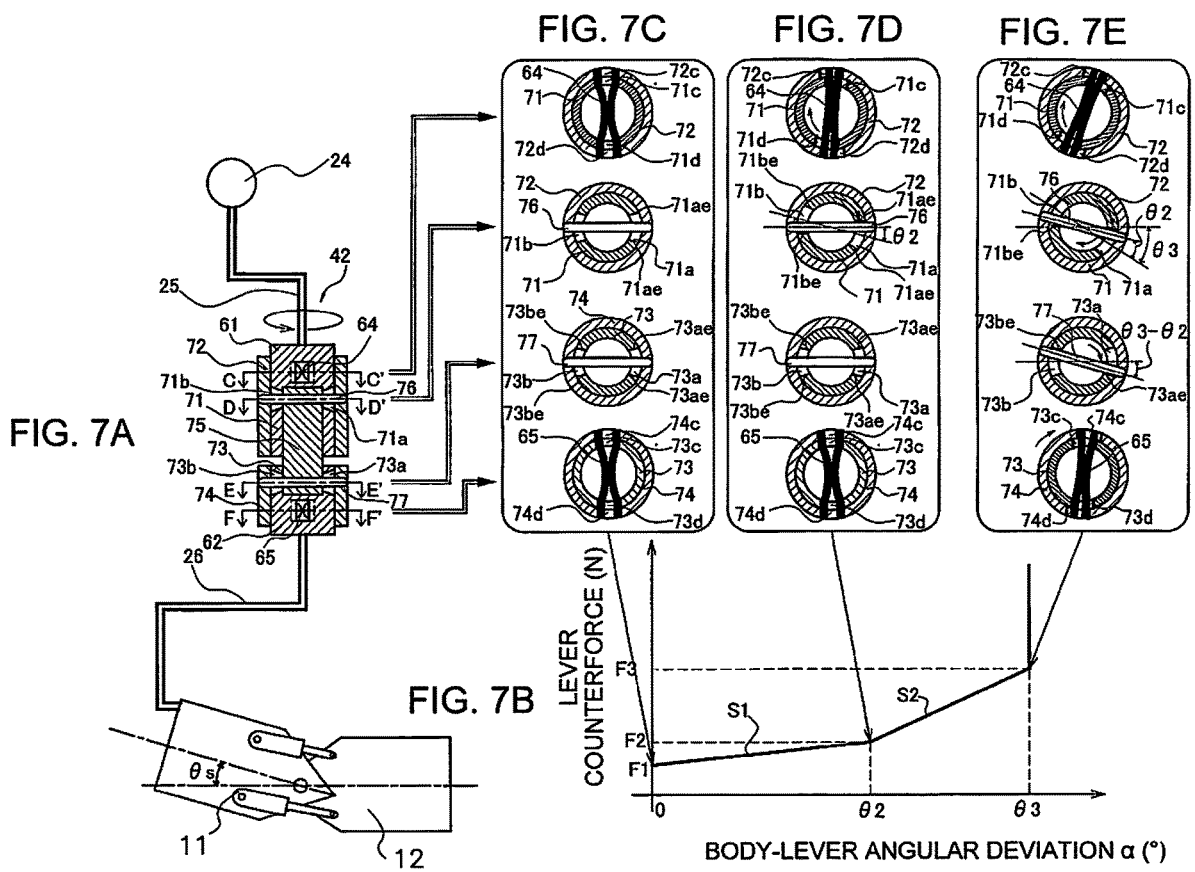
FIG. 7A is a simplified diagram of the pilot valve in FIG. 3.
FIG. 7B is a graph of the relation between the lever counterforce and the body-lever angular deviation in the pilot valve in FIG. 7A.
FIG. 7C is a cross section along the CC', DD', EE', and FF' lines in FIG. 7A when the angular deviation α is zero.
FIG. 7D is a cross section along the CC', DD', EE', and FF' lines in FIG. 7A when the angular deviation α is θ2.
FIG. 7E is a cross section along the CC', DD', EE', and FF' lines in FIG. 7A when the angular deviation α is θ3.

As described later in below through reference to FIG. 7, when the operation spool 71 rotates with respect to the operation sleeve 72 up to the angle at which the operation spool 71 is restricted, and the joystick lever 24 is then operated, as shown in FIG. 4D, the second spring 65 bends and the feedback sleeve 74 rotates with respect to the feedback spool 73. FIG. 4D is a cross section along the BB' line in FIG. 3, and since the view is from below, the arrow indicating the rotational direction is reversed from that in FIG. 4B.

That is, when the joystick lever 24 is operated past the angle at which the operation spool 71 is restricted with respect to the operation sleeve 72, the operator must operate the joystick lever 24 against the biasing force of the second spring 65.

With the above configuration of the feedback unit 66, when the feedback input shaft 62 rotates in accordance with a change in the steering angle, the feedback spool 73 rotates, and the feedback sleeve 74 that is linked to the feedback spool 73 via the second spring 65 also rotates. Then, the operation sleeve 72, which is fixed to the feedback sleeve 74 via the second center pin 77, the drive shaft 75, and the first center pin 76, also rotates, which produces a change in the difference in rotational angle between the operation spool 71 and the operation sleeve 72 and changes the pilot pressure.

That is, with the pilot valve 42, the position of the operating spool 71 with respect to the operation sleeve 72 moves to the neutral position Np, the left pilot position Lp, or the right pilot positions Rp, according to the difference α between the rotational angle θin of the operation input shaft 61 and the rotational angle θfb (matches the steering angle θs) of the feedback input shaft 62. When the rotational angle difference α is zero, the operation spool 71 is in the neutral position Np with respect to the operation sleeve 72. Also, when the operation spool 71 is in the left pilot position Lp or the right pilot positions Rp with respect to the operation sleeve 72, the pilot valve 42 changes the opening surface area through which fluid from the pilot hydraulic source 43 passes, according to the rotational angle difference α. Consequently, the pilot pressure sent from the pilot valve 42 to the steering valve 32 is adjusted according to the rotational angle difference α.

A first rotational angle sensor 101, constituted by a rotary sensor, for example, is provided to the input shaft 61. The first rotational angle sensor 101 senses the rotational angle θin of the operation input shaft 61. A second rotational angle sensor 102, constituted by a rotary sensor, for example, is provided to the feedback input shaft 62. The second rotational angle sensor 102 senses the rotational angle θfb (=θs) of the feedback input shaft 62. The rotational angles θin and θfb sensed by the first rotational angle sensor 101 and the second rotational angle sensor 102 are sent as sensing signals to the controller 28.

As discussed above, the steering angle θs at the linking shaft 13 is also sensed by a steering angle sensor 104, but since the rotational angle θfb of the feedback input shaft 62 matches the steering angle θs, the steering angle sensor 104 may be omitted.

1-2-3. Joystick Lever, Link

Figure 5:
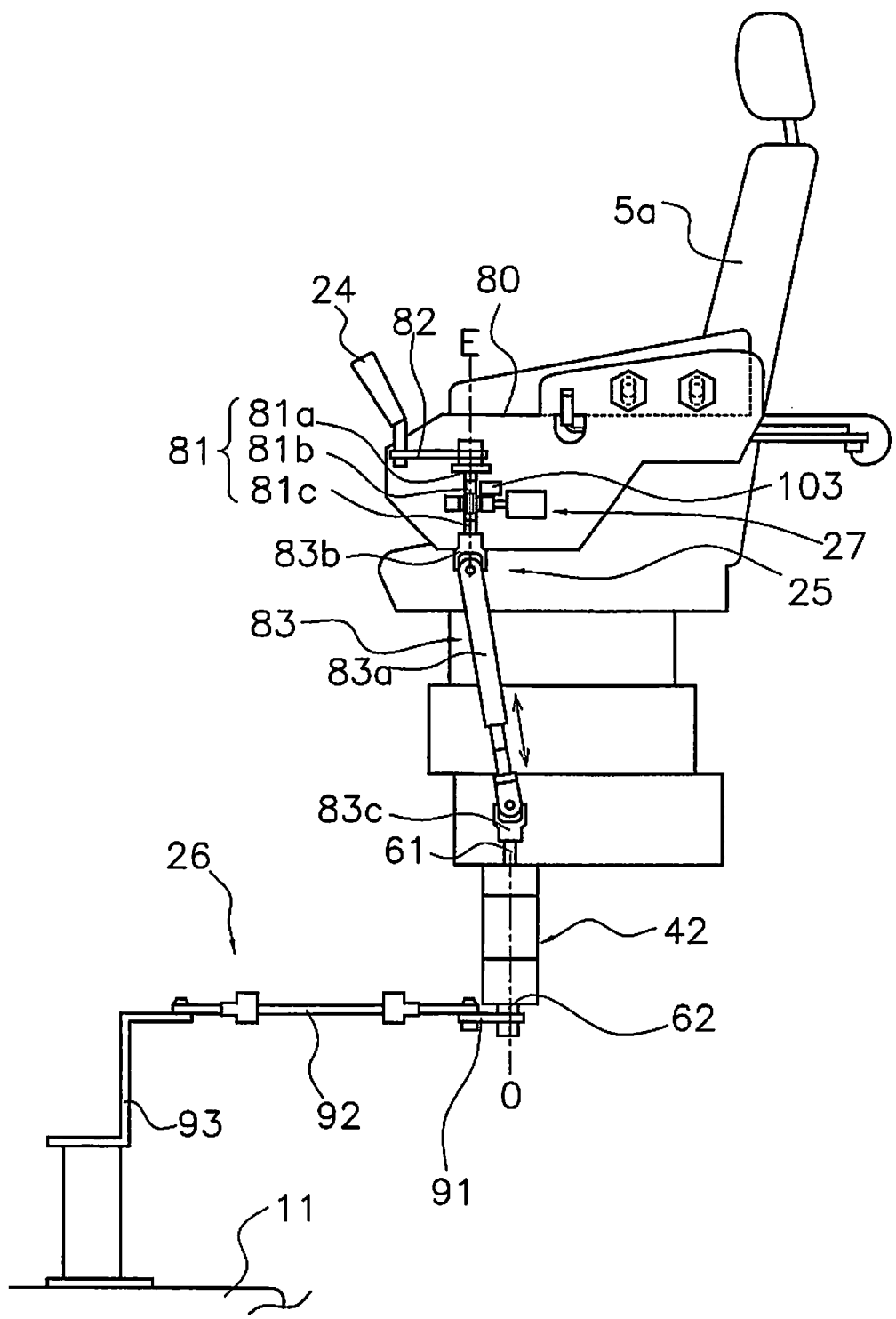
FIG. 5 is a side view of the link and linking mechanism in FIG. 2.

FIG. 5 is a side view of the configuration inside the cab 5. An operator's seat 5a in which the operator sits is provided inside the cab 5. A steering box 80 is disposed on the left side in the vehicle width direction of the operator's seat 5a.

The joystick lever 24 is disposed protruding obliquely upward toward the front from the steering box 80.

The link 25 links the joystick lever 24 and the pilot valve 42. The link 25 mainly has a steering operation shaft 81, a linking bar 82, and a universal joint 83.

The steering operation shaft 81 is disposed vertically, and is supported rotatably around its center axis E by the steering box 80. The linking bar 82 is disposed inside the steering box 80, and links the joystick lever 24 to the steering operation shaft 81.

More precisely, the steering operation shaft 81 is made up of a lever-side shaft 81a, an input shaft 81b, and a valve-side shaft 81c that are connected in that order (see FIG. 8 discussed below). That is, one end of the lever-side shaft 81a is linked to the linking bar 82, and the other end of the lever-side shaft 81a is linked to one end of the input shaft 81b. The other end of the input shaft 81b is connected to one end of the valve-side shaft 81c, and the other end of the valve-side shaft 81c is connected to the universal joint 83. An assist force or a counterforce from the force imparting component 27 (discussed below) is inputted to the input shaft 81b.

The universal joint 83 links the steering operation shaft 81 to the operation input shaft 61 of the pilot valve 42 disposed near the operator's seat 5a. The universal joint 83 has a telescoping center portion 83a and joint portions 83b and 83c disposed at both ends of the center portion 83a. The joint portion 83b is linked to the steering operation shaft 81. The joint portion 83c is linked to the operation input shaft 61.

Figure 6:
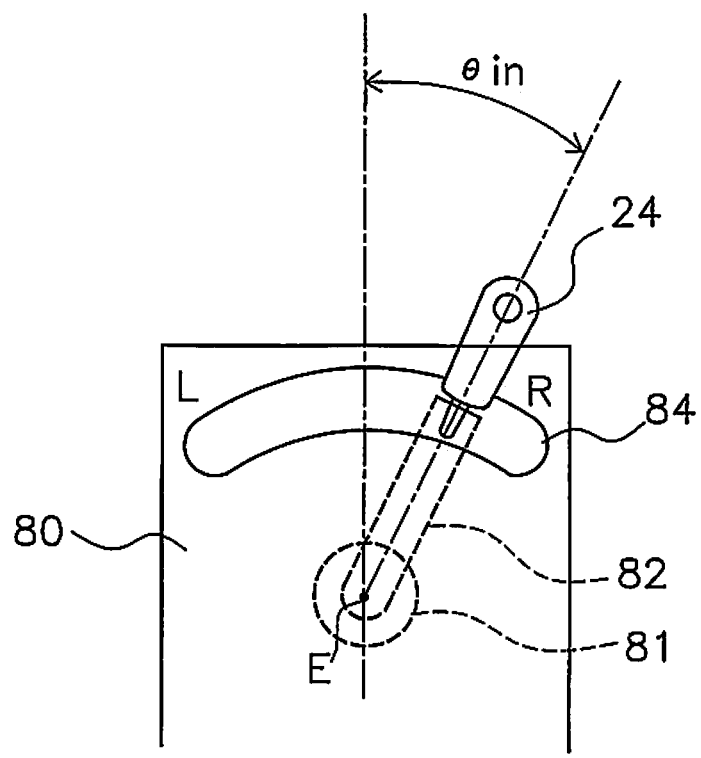
FIG. 6 shows joystick lever in FIG. 5 as seen from above.

FIG. 6 is a plan view of the area near the joystick lever 24 as seen from above. As shown in FIG. 6, the joystick lever 24 is formed protruding obliquely upward from an arc-shaped hole 84 formed in the upper face of the steering box 80. The joystick lever 24 is capable of turning horizontally around the steering operation shaft 81 (more precisely, the center axis E). Also, the edge of the right end of the hole 84 of the steering box 80 is marked with an R, and the edge of the left end is marked with an L.

For example, as shown in FIG. 6, when the operator rotates joystick lever 24 by the rotational angle θin to the right from the center position, the steering operation shaft 81 also rotates to the right by the rotational angle θin. This rotation of the steering operation shaft 81 by the rotational angle θin is transmitted through the universal joint 83 to the operation input shaft 61, and the operation input shaft 61 also rotates to the right by the rotational angle θin. The same applies when the joystick lever 24 is rotated to the left.

1-2-4. Linking Mechanism

The linking mechanism 26 has a follow-up lever 91, a follow-up link 92, and a bracket 93. The follow-up link 92 is fixed to the feedback input shaft 62 of the pilot valve 42. The bracket 93 is fixed to the front frame 11. The follow-up link 92 is linked to the follow-up lever 91 and the bracket 93.

This linking mechanism 26 links the front frame 11 to the pilot valve 42 disposed on the rear frame 12.

The linking mechanism 26 makes the steering angle θs of the front frame 11 with respect to the rear frame 12 be the same as the rotational angle θfb of the feedback input shaft 62.

That is, when the front frame 11 rotates to the right side around the linking shaft 13 with respect to the rear frame 12 by the steering angle θs, the feedback input shaft 62 also rotates right by the rotational angle θs via the linking mechanism 26, and when the front frame 11 rotates to the left side by the steering angle θs, the feedback input shaft 62 also rotates left by the rotational angle θs via the linking mechanism 26.

1-2-5. Lever Counterforce

The lever counterforce produced by the first spring 64 and the second spring 65 when the joystick lever 24 is operated will now be described.

FIG. 7A is a simplified diagram of the pilot valve 42. FIG. 7B is a graph of the relation between lever counterforce and the body-lever angular deviation. The body-lever angular deviation α is the difference (θin−θfb) between the rotational angle θin of the joystick lever 24 and the steering angle θs of the front frame 11 with respect to the rear frame 12. FIG. 7C is a cross section along the CC', DD', EE', and FF' lines in FIG. 7A when the angular deviation α is zero. FIG. 7D is a cross section along the CC', DD', EE', and FF' lines in FIG. 7A when the angular deviation α is θ2, and FIG. 7E is a cross section along the CC', DD', EE', and FF' lines in FIG. 7A when the angular deviation α is θ3. As shown in FIG. 7A, the cross sections along the CC', DD', EE', and FF' lines are all as seen from above. In FIG. 7B, play in the joystick lever 24 is not taken into account in order to make the illustration easier to understand.

When the operator rotates the joystick lever 24 by the rotational angle θin from the center position, the operation input shaft 61 also rotates by the rotational angle θin. Meanwhile, since the response of the steering cylinders 21 and 22 is delayed, the steering angle θs increases gradually in accordance with the rotational angle θin. The rotational angle θin of the joystick lever 24 represents the target steering angle, while the steering angle θs indicates the actual steering angle. The feedback input shaft 62 also rotates by the same rotational angle θs in response to a change in the steering angle θs. The feedback spool 73 also rotates together with the feedback input shaft 62, and this rotation causes the feedback sleeve 74 linked via the second spring 65 to rotate as well.

Since the feedback sleeve 74 and the operation sleeve 72 are integrated with the first center pin 76, the second center pin 77, and the drive shaft 75, rotation of the feedback sleeve 74 causes the operation sleeve 72 to rotate as well.

Specifically, the difference between the rotational angle of the operation spool 71 and the rotational angle of the operation sleeve 72 corresponds to the angular deviation α (see FIG. 4B).

Since the first spring 64 biases the operation spool 71 to the neutral position Np with respect to the operation sleeve 72, the joystick lever 24 must be operated against the biasing force of the first spring 64 in order to increase the angular deviation α.

The first spring 64 has the spring property S1 shown in FIG. 7B. With the spring property S1 of the first spring 64, the joystick lever 24 must be operated with a force at or above an initial counterforce F1 (the force required to begin to bend the first spring 64) in order to rotate the operation input shaft 61. Also, with the spring property S1 of the first spring 64, the lever counterforce increases in proportion to the angular deviation α. That is, as the angular deviation α increases, the force required to operate the joystick lever 24 increases.

As shown in FIG. 7C, in the neutral position Np where the angular deviation α is zero, the first center pin 76 is disposed in the center of the slits 71a and 71b of the operation spool 71. The second center pin 77 is disposed in the center of the slits 73a and 73b of the feedback spool 73.

The joystick lever 24 is then rotated to the right side, for example, to increase the angular deviation α, and when the angular deviation α reaches the angle θ2, as shown in FIG. 7D, the first center pin 76 hits the wall 71ae formed in the peripheral direction of the slit 71a, and the wall 71be formed in the peripheral direction of the slit 71b. At this point the second center pin 77 is disposed in the center of the slits 73a and 73b of the feedback spool 73. This is because if we let F2 be the counterforce produced by the first spring 64 when the angular deviation α is the angle 92, the initial counterforce (the force needed to start bending the second spring 65) is set to F2 as indicated by the spring property S2 of the second spring 65. The initial counterforce of the second spring 65 may be set higher than F2, or may be greater than or equal to F2.

Furthermore, the operator must operate the joystick lever 24 against the counterforce of the second spring 65 to rotate it to the right side. That is, when the joystick lever 24 is further rotated to the right side, since the first center pin 76 is hitting the walls 71ae and 71be, it is necessary to rotate the operation sleeve 72 if an attempt is made to rotate the operation spool 71. Also, as discussed above, the operation sleeve 72 is integrated with the feedback sleeve 74, and the feedback spool 73 is connected to the feedback input shaft 62. Therefore, when the joystick lever 24 is further rotated to the right side, the operator operates against the counterforce of the second spring 65, as shown in FIG. 4D.

When the angular deviation α reaches θ3, as shown in FIG. 7E, the second center pin 77 hits the wall 73ae formed in the peripheral direction of the slit 73a and the wall 73be formed in the peripheral direction of the slit 73b. Thus, the second center pin 77 is able to rotate by an angle (θ3−θ2). That is, the pilot valve 42 is configured so that the angular deviation α will not exceed the angle θ3. Therefore, as shown in FIG. 7B, the lever counterforce goes straight up at the angle θ3. If the second center pin 77 strikes the walls 73ae and 73be with sufficient energy, a sharp rebound will be generated to put a burden on the operator's wrist. This angle θ3 is also referred to as the catch-up angle.

In FIG. 7B, an example was illustrated in which the joystick lever 24 was rotated to the right side, but the same applies when the rotation is to the left side, in which case the angular deviation α becomes a negative value, in left and right symmetry as indicated by the dotted line L3 shown in FIG. 9B (discussed below). That is, the first center pin 76 hits the walls 71ae and 71be at an angle of −θ2, and the second center pin 77 hits the walls 73ae and 73be at −θ3. Thus, the pilot valve 42 is configured so that the absolute value of the angular deviation α will not exceed the angle θ3.

Until the angular deviation α reaches θ2, there will be a difference between the rotational angle of the operation spool 71 and the rotational angle of the operation sleeve 72, but once the angle θ2 is exceeded, there is no longer any difference between the rotational angles of the operation spool 71 and the operation sleeve 72, so the aperture of the pilot valve 42 stays constant. Also, while the aperture of the pilot valve 42 remains constant when the angular deviation α is between the angles θ2 and θ3, the pilot pressure should be varied according to the angular deviation by controlling the variable pressure reducer 41.

1-2-6. Force Imparting Component

Figure 8:
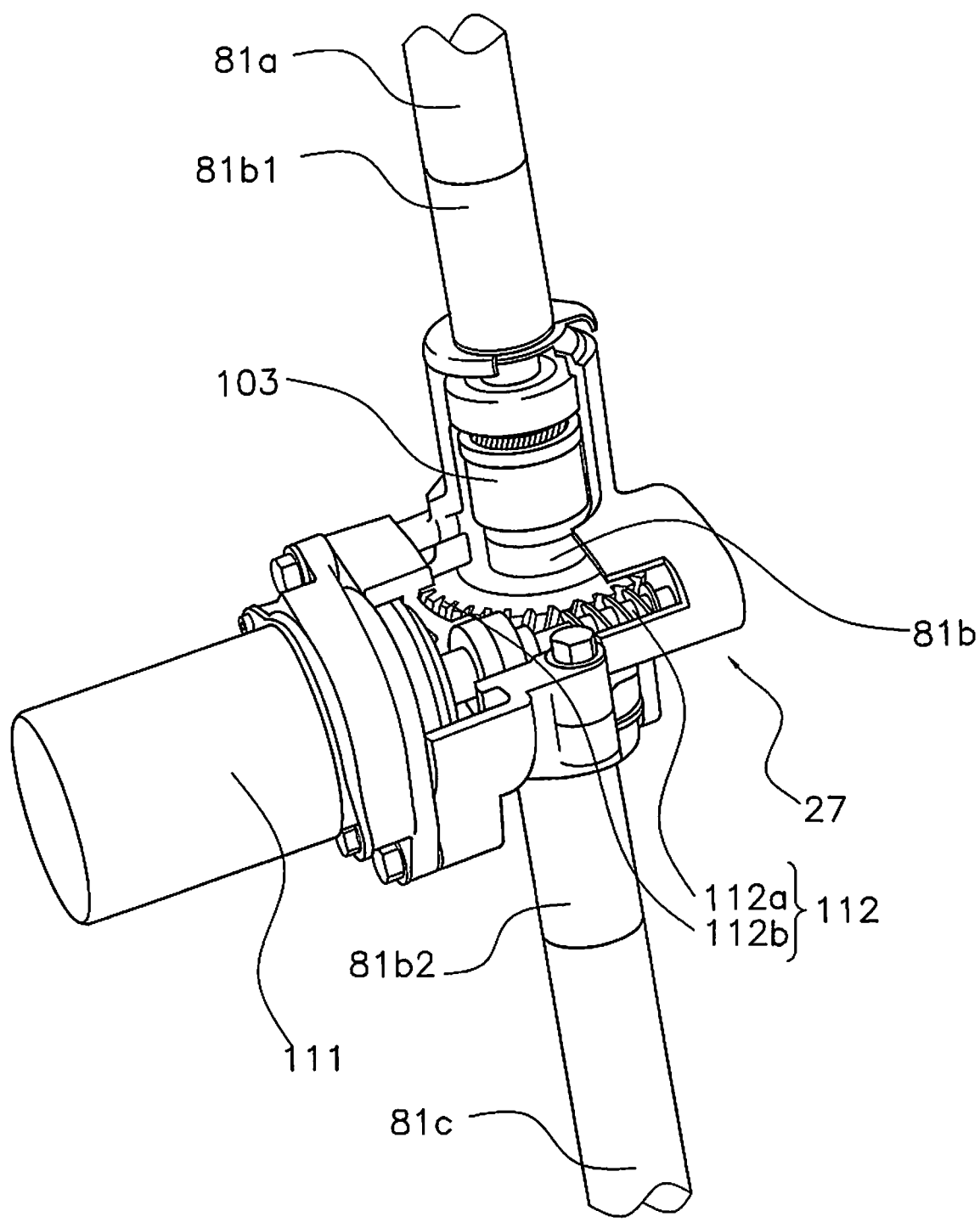
FIG. 8 is an oblique view of the configuration of the force imparting component in FIG. 2.

FIG. 8 is an oblique view of the force imparting component 27. The force imparting component 27 imparts an assist force or counterforce to the operation of the joystick lever 24. The force imparting component 27 has an electric motor 111 and a worm gear 112. The worm gear 112 has a cylindrical worm 112a and a worm wheel 112b. The worm wheel 112b is provided around the above-mentioned input shaft 81b, and meshes with the cylindrical worm 112a. The output shaft of the electric motor 111 is connected to the cylindrical worm 112a, and rotates the cylindrical worm 112a around its center axis. The electric motor 111 is driven on the basis of a command from a drive circuit 204 provided to the controller 28.

The first end 81b1 of the input shaft 81b is connected to the lever-side shaft 81a, and the second end 81b2 is connected to the valve-side shaft 81c.

When the electric motor 111 is driven, the cylindrical worm 112a rotates, this rotation causes the worm wheel 112b to rotate, and rotational force is also produced at the input shaft 81b that is fixed to the worm wheel 112b. Rotational force can be applied for left rotation or right rotation to the input shaft 81b by changing the direction of rotation of the cylindrical worm 112a.

For example, when the joystick lever 24 is rotated to the right, an assist force is imparted to the operation of the joystick lever 24 by applying a force in the right rotation direction to the input shaft 81b. Also, when the joystick lever 24 is rotated to the right, a counterforce is imparted to the operation of the joystick lever 24 by applying a force in the left rotation direction to the input shaft 81b.

A torque sensor 103 is provided to the input shaft 81b. The torque sensor 103 senses the torque generated at the input shaft 81b exerted on the joystick lever 24 by the operator. The torque sensor 103 in this embodiment, for example, senses the torque generated at the input shaft 81b and the rotation direction of the input shaft 81b by sensing the twisting of a torsion bar with a coil, for example. The sensed rotation direction and torque T are outputted to the controller 28 as a steering torque signal.

1-2-7. Controller

The controller 28 has an arithmetic unit such as a CPU, and a storage device such as a RAM or a ROM. The controller 28 has the drive circuit 204, and the electric motor 111 is controlled by the drive circuit 204. The rotational angle θin of the operation input shaft 61 sensed by the first rotational angle sensor 101, the rotational angle θfb (=θs) of the feedback input shaft 62 sensed by the second rotational angle sensor 102, and the steering angle θs sensed by the steering angle sensor 104 are inputted as sensing signals to the controller 28.

The vehicle speed V sensed by a vehicle speed sensor 105 is also inputted as a sensing signal to the controller 28. Further, the torque T sensed by the torque sensor 103 is inputted as a steering torque signal to the controller 28. The controller 28 controls the variable pressure reducer 41 by outputting a command signal to the variable pressure reducer 41, either over a wire or wirelessly.

The controller 28 controls the variable pressure reducer 41 on the basis of the rotational angle θin, the rotational angle θfb (=θs), and the vehicle speed V. Consequently, the source pressure of the pilot pressure sent to the pilot valve 42 can be controlled so that there will be no abrupt changes in the flow of fluid to the left and right steering cylinders 21 and 22. Also, the controller 28 controls the electric motor 111 on the basis of the rotational angle θin, the rotational angle θfb (=θs), the vehicle speed V, the torque T, and so forth.

Thus, the controller 28 can impart an assist force or counterforce to the operation of the joystick lever 24 by the operator by driving the electric motor 111 on the basis of the value of the torque T. Also, the controller 28 can impart an assist force or counterforce to the operation of the joystick lever 24 by the operator by driving the electric motor 111 on the basis of the angular deviation α of the steering angle θs and the operation angle θin of the joystick lever 24.

2. Operation

The steering operation with the wheel loader 1 in this embodiment will now be described.

2-1. Steering Operation

If the joystick lever 24 is in the center position, the operation input shaft 61 is located in a predetermined initial position, and the rotational angle θin produced by the operation input shaft 61 is zero. Also, since the steering angle θs is zero, the feedback input shaft 62 is also located in a predetermined initial position. In this embodiment, as shown in FIG. 7A, the steering angle θs indicates the angle from a state in which the angle along the longitudinal direction with respect to the rear frame 12 is zero. As shown in FIG. 6, the rotational angle θin indicates the rotational angle from the center position of the joystick lever 24. Also, in finding the angular deviation, computation may be performed using a positive angle for rotation to the right and a negative angle for rotation to the left, for example.

At this point, the operation spool 71 is located in the neutral position Np shown in FIG. 4A with respect to the operating sleeve 72. In this case, the pilot pressure in the first pilot chamber 34 and in the second pilot chamber 35 of the steering valve 32 is the same, and the valve body 33 of the steering valve 32 is also in the neutral position Ns. Therefore, no fluid is supplied or discharged to or from the left and right steering cylinders 21 and 22, the steering angle θs is maintained at zero, and the rotational angle θfb (=θs) of the feedback input shaft 62 is also maintained at zero.

Next, the operator exerts an operation force Fin to rotate the joystick lever 24 to the right side from the center position as shown in FIG. 6. When the operating force Fin exceeds F1 of the first spring 64, the operation input shaft 61 rotates to the right the same as the joystick lever 24, and the rotational angle θin of the first operation input shaft 61 is increased. At this point, because of the delay in the response of the left and right steering cylinders 21 and 22, the steering angle θs is still at zero, and the rotational angle θfb (=θs) of the feedback input shaft 62 is also zero. Therefore, the angular deviation (α=θin−θs) between the rotational angle θin and the steering angle θs increases.

The operation spool 71 rotates to the right with respect to the operation sleeve 72 together with the rotation of the operation input shaft 61. Here, the operation sleeve 72 is integrated with the feedback sleeve 74, and the feedback sleeve 74 is linked to the feedback spool 73 by the second spring 65. The initial counterforce F2 of the second spring 65 is at or above the counterforce of the spring property S1 of the first spring 64 shown in FIG. 7B. Therefore, the operation sleeve 72 does not rotate along with the operating spool 71, and operating the spool 71 rotates to the right with respect to the operation sleeve 72.

Thus, the operating spool 71 rotates to the right with respect to the operation sleeve 72 and moves to the right pilot positions Rp, pilot pressure is supplied to the second pilot port P8, and the pilot pressure is supplied to the second pilot chamber 35.

Thus, the valve body 33 of the steering valve 32 moves to the right steering position Rs, fluid is supplied to the extension port 21a of the steering cylinder 21 and the contraction port 22b of the steering cylinder 22, and fluid is discharged from the contraction port 21b of the steering cylinder 21 and the extension port 22a of the steering cylinder 22. This gradually increases the steering angle θs, and the front frame 11 is oriented in the right direction with respect to the rear frame 12 (see R in FIG. 2). This change in the steering angle θs is transmitted by the linking mechanism 26 to the feedback input shaft 62, and the feedback input shaft 62 rotates at the rotational angle θs.

When the operator stops the joystick lever 24 at a predetermined rotational angle θ1, the operation input shaft 61 also stops at the rotational angle θ1. On the other hand, since the steering angle θs is gradually increasing, the rotational angle θs of the feedback input shaft 62 also increases. The feedback spool 73 also rotates along with the feedback input shaft 62, and the feedback sleeve 74 linked via the second spring 65 to the feedback spool 73 also rotates. Since the feedback sleeve 74 is integrated with the operation sleeve 72 via the first center pin 76, the second center pin 77, and the drive shaft 75, the operation sleeve 72 also rotates along with the rotation of the feedback sleeve 74. Rotation of the operation sleeve 72 reduces the difference in the rotational angle (deflection angle α) between the operation sleeve 72 and the operation spool 71. When the steering angle θs (the rotational angle θs of the feedback input shaft 62) catches up with the rotational angle θ1 (the rotational angle θin of the operation input shaft 61), the angular deviation α drops to zero. At this point, the operation spool 71 of the pilot valve 42 is located in the neutral position Np with respect to the operation sleeve 72. In this case, the pilot pressure in the first pilot chamber 34 and the second pilot chamber 35 of the steering valve 32 is the same, and the steering valve 32 is also in the neutral position Ns. Therefore, no fluid is supplied or discharged to or from the left and right steering cylinders 21 and 22, and the steering angle θs is maintained at the rotational angle θ1.

When the joystick lever 24 is thus rotated to the right side and stopped at a predetermined rotational angle θ1, the steering angle θs is also maintained at the same rotational angle θ1. This keeps the front frame 11 oriented in the direction of the rotational angle θ1, to the right with respect to the rear frame 12.

When the operator then returns the joystick lever 24 from the right side position to the center position, the operation input shaft 61 similarly rotates, which reduces the rotational angle θin of the operation input shaft 61. At this point, because of the delay in the response of the left and right steering cylinders 21 and 22, the steering angle θs is still the rotational angle θ1. Therefore, the rotational angle difference α (=θin−θs) decreases from zero and becomes negative. Then, the operation spool 71 rotates to the left with respect to the operation sleeve 72 and moves to the left pilot position Lp, and pilot pressure is supplied to the first pilot port P7. Consequently, the valve body 33 of the steering valve 32 moves to the left steering position Ls, fluid is supplied to the contraction port 21b of the steering cylinder 21 and the extension port 22a of the steering cylinder 22, and fluid is discharged from the extension port 21a of the steering cylinder 21 and the contraction port 22b of the steering cylinder 22. This gradually reduces the steering angle θs from the rotational angle θ1. This change in the steering angle θs is transmitted by the linking mechanism 26 to the feedback input shaft 62, and the feedback input shaft 62 rotates at the same change in rotational angle as the change in the steering angle θs.

When the operator stops the joystick lever 24 in its center position, the operation input shaft 61 also stops at its initial position, that is, at a position where the rotational angle θin is zero. Meanwhile, since the steering angle θs is gradually decreasing from the rotational angle θ1, the difference in rotational angle (angular deviation) α decreases gradually. When the steering angle θs reaches zero, the rotational angle θfb (=θs) of the feedback input shaft 62 also reaches zero, and the rotational angle difference α becomes zero. At this point, the operation spool 71 is disposed in the neutral position Np with respect to the operation sleeve 72. In this case, the pilot pressure in the first pilot chamber 34 and the second pilot chamber 35 of the steering valve 32 is the same, and the steering valve 32 is also in the neutral position Ns. Therefore, no fluid is supplied or discharged to or from the left and right steering cylinders 21 and 22, and the steering angle θs goes back to zero and is maintained there. Consequently, the front frame 11 is returned to an orientation along the longitudinal direction with respect to the rear frame 12.

The situation is the same when the joystick lever 24 is rotated to the left side, and will therefore not be described here.

2-2. Control of Force Imparting Component

Next, the control of the force imparting component 27 when the joystick lever 24 is operated as above will be described.

With the wheel loader 1 in this embodiment, the electric motor 111 is controlled so as to impart an assist force or counterforce on the basis of the sensed torque, the angular deviation α, etc., based on the assist information stored in the controller 28.

2-2-1. Control Based on Torque

Operation with the joystick lever 24 is performed as above, but the controller 28 controls the electric motor 111 so as to impart an auxiliary force or counterforce to the operation of the joystick lever 24 on the basis of the sensing signal from the torque sensor 103.

Figure 9A:
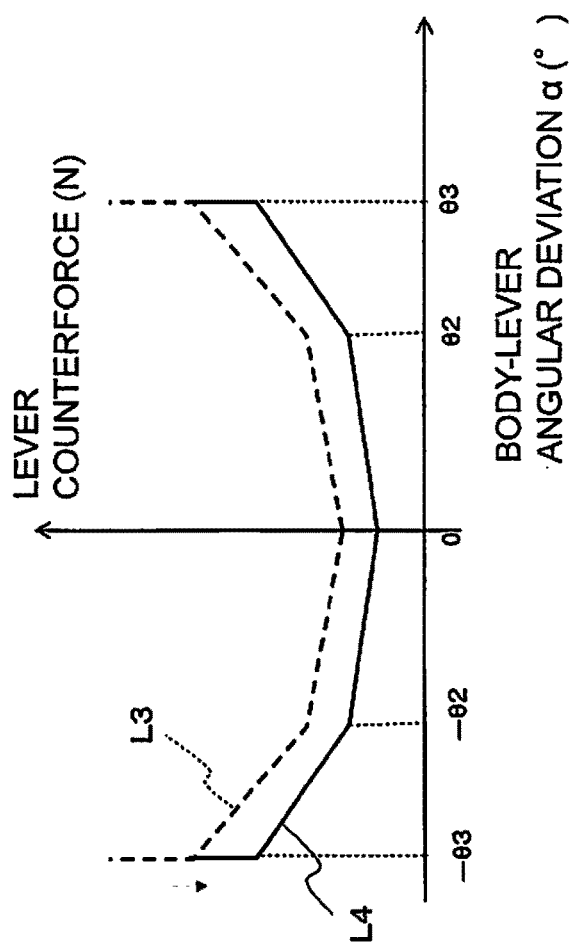
FIG. 9A is a graph of assist torque information (the assist torque imparted with respect to the lever input torque) stored in the controller in FIG. 2.

FIG. 9A is a graph of the imparted assist torque (assist torque information) versus the torque sensed by the torque sensor 103. The assist torque information shown in FIG. 9A is stored in the storage device of the controller 28.

In the graph shown in FIG. 9A, the positive lever input torque indicates the torque produced by the rotation of the joystick lever 24 to the right side, and the negative lever input torque indicates the torque produced by the rotation of the joystick lever 24 to the left side. Also, the positive assist torque indicates the force exerted by the force imparting component 27 to the right rotation direction, while the negative assist torque indicates the force exerted by the force imparting component 27 to the left rotation direction.

That is, the line L1 in FIG. 9A shows that a force in the right rotation direction is imparted to the input shaft 81b when the joystick lever 24 is operated to the right side, and the line L2 shows that a force in the left rotation direction is imparted to the input shaft 81b when the joystick lever 24 is operated to the left side. Also, the assist torque is set so that the larger is the absolute value of the torque sensed by the torque sensor 103, the greater the imparted assist force will be.

FIG. 9A also shows a dotted line L2' that is symmetrical with the line L2 with respect to the horizontal axis. As can be seen from a comparison of the dotted line L2' and the line L1, the assist force is imparted in left and right symmetry when the joystick lever 24 is operated to the right side and when it is operated to the left side. That is, the same amount of assist force is imparted when the absolute value of the lever input torque is equal in operation to the left and right of the joystick lever 24.

When the operator operates the joystick lever 24 and torque is generated at the input shaft 81b, the controller 28 finds the assist force from this torque on the basis of the assist torque information shown in FIG. 9A, and controls the electric motor 111 so that this assist force will be imparted.

Figure 9B:
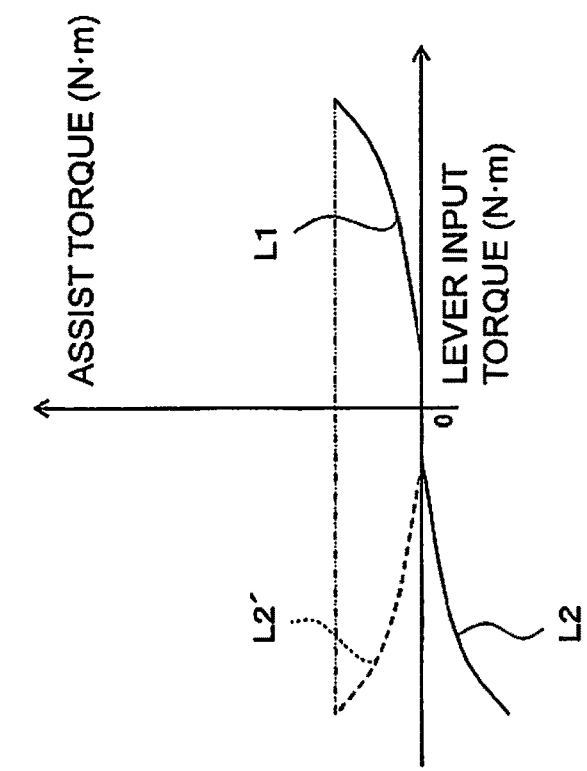
FIG. 9B is a graph of lever counterforce with respect to body-lever angular deviation when assist torque is not imparted and is imparted on the basis of the assist torque information in FIG. 9A.

FIG. 9B is a graph of lever counterforce versus angular deviation when no assist force is imparted (dotted line L3) and when an assist force is imparted on the basis of the assist torque information in FIG. 9A (solid line L4). In FIG. 9B, the positive angular deviation α indicates a case in which the operation input shaft 61 has a larger rotational angle to the right rotation side than the feedback input shaft 62, while the negative angular deviation α indicates a case in which the operation input shaft 61 has a larger rotational angle to the left rotation side than the feedback input shaft 62. The dotted line L3 in FIG. 9B indicates the same state as in FIG. 7B.

As shown in FIG. 9B, the lever counterforce can be reduced in operation of the joystick lever 24, and the joystick lever 24 can be operated with a lighter force.

2-2-2. Control of Force Imparting Component based on Angular Deviation α

Next, an example of control of the force imparting component 27 based on the angular deviation α will be given. As discussed above, in operation of the joystick lever 24 to the right and left, when the angular deviation α reaches ±θ3 (also called the catch-up angle), the second center pin 77 hits the walls 73ae and 73be. If the joystick lever 24 is operated vigorously at this point, the impact can result in an abrupt recoil on the wrist.

Figure 10B:
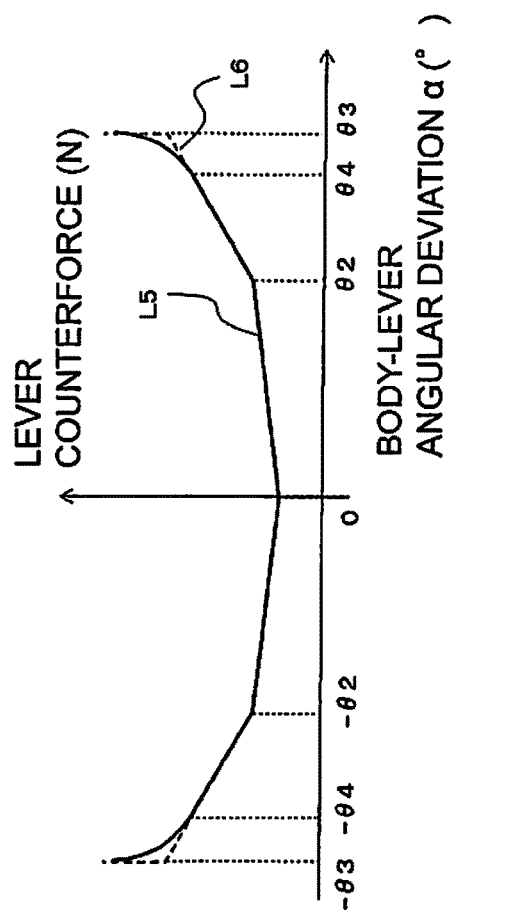
FIG. 10B is a graph of lever counterforce with respect to body-lever angular deviation when assist torque is not imparted and is imparted on the basis of the assist torque information in FIG. 10A.
Figure 10A:
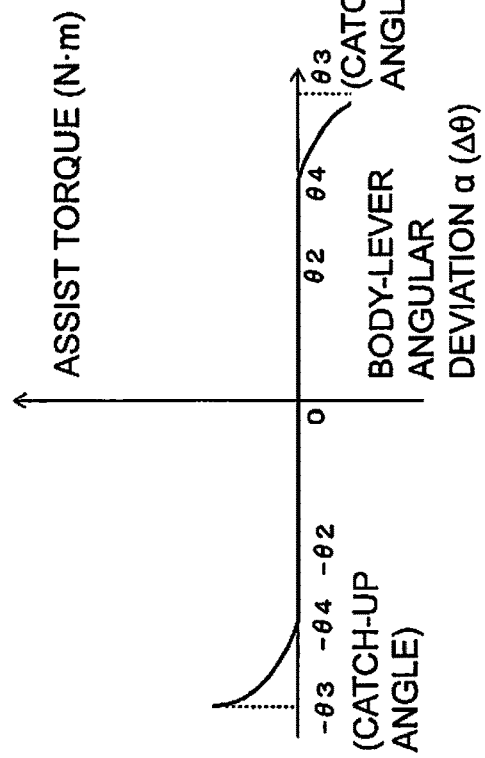
FIG. 10A is a graph of assist torque information (the assist torque imparted with respect to the body-lever angular deviation) stored in the controller in FIG. 2.

To mitigate this abrupt recoil on the wrist, the assist torque information shown in FIG. 10A is stored in the controller 28. FIG. 10A is a graph of an assist torque (assist torque information) versus body-lever angular deviation (α). With the assist torque information shown in FIG. 10A, counterforce is generated when the angular deviation α reaches an angle of ±θ4, and assist torque is set so that the counterforce will be exponentially larger as the absolute value of the angular deviation becomes larger.

More precisely, the assist torque is set so that when the joystick lever 24 is rotated to the right side and the angular deviation α reaches an angle of +θ4, a force is imparted in the left rotation direction to the input shaft 81b. When the joystick lever 24 is rotated to the left side and the angular deviation α reaches an angle of −↓4, the assist torque is set so that a force is imparted in the right rotation direction to the input shaft 81b. The angle θ4 is set between the angles θ2 and θ3 shown in FIG. 10A. The angle −θ4 is set between −θ2 and −θ3.

FIG. 10b is a graph of the lever counterforce versus the body-lever deflection angle when no assist torque is imparted and when assist torque is imparted on the basis of the assist torque information shown in FIG. 10A. The solid line L5 indicates the case when assist torque is imparted, while the dotted line L6 indicates the case when no assist torque is imparted. The dotted line L6 is the same as the dotted line L3 in FIG. 9B discussed above.

As shown in FIG. 10b, the lever counterforce increases exponentially when the angular deviation α reaches an angle of ±θ4 and the absolute value of the angle becomes larger.

Because the counterforce is thus exponentially increased, the operation of the joystick lever 24 becomes heavier as the second center pin 77 approaches the walls 73ae and 73be, so the second center pin 77 will strike the walls 73ae and 73be with less momentum.

Furthermore, the assist torque information shown in FIG. 9A and the assist torque information shown in FIG. 10A may be combined, and the force imparting component 27 may be controlled on the basis of this combined assist torque information.

3. Features

3-1

The wheel loader 1 in this embodiment (an example of a work vehicle) is an articulated wheel loader in which the front frame 11 and the rear frame 12 are linked, and comprises the steering cylinders 21 and 22 (an example of a hydraulic actuator), the pilot valve 42 (an example of a control valve), the joystick lever 24 (an example of an operation member), and the force imparting component 27. The steering cylinders 21 and 22 are driven hydraulically, and change the steering angle θs of the front frame 11 with respect to the rear frame 12. The pilot valve 42 controls the flow of fluid supplied to the steering cylinders 21 and 22. The joystick lever 24 is linked to the pilot valve 42 and is operated by an operator. The force imparting component 27 imparts an assist force or counterforce to the operation of the joystick lever 24.

The force required to operate the joystick lever 24 is mainly determined by the pilot valve 42, but the tactile sensation can be varied to match the situation of the wheel loader 1 by using the force imparting component 27 to impart an assist force or a counterforce to the operation of the joystick lever 24.

For example, when the wheel loader 1 is moved at low speed, operability can be improved by imparting an assist force to the joystick lever 24 and thereby reducing the force required to operate the joystick lever 24. On the other hand, when the travel speed of the wheel loader 1 is changed from low to high, travel stability can be improved by imparting a counterforce to the joystick lever 24 to increase the force required to operate the joystick lever 24.

Thus, the tactile sensation experienced by the operator can be improved by suitably varying the force required to operate the operation member to suit the travel state of the wheel loader 1.

3-2

The wheel loader 1 (an example of a work vehicle) in this embodiment further comprises the link 25. The link 25 links the joystick lever 24 (an example of an operation member) to the pilot valve 42 (an example of a control valve). The force imparting component 27 further has a worm gear 112 (an example of a transmission mechanism) for transmitting an assist force or counterforce to the link 25.

This allows the force of the force imparting component 27 to be transmitted to the link 25 that links the joystick lever 24 to the pilot valve 42 and allows the force needed to operate the joystick lever 24 to be changed.

3-3

With the wheel loader 1 (an example of a work vehicle) in this embodiment, the force imparting component 27 includes the electric motor 111 as a drive source.

This allows the force produces by the electric motor 111 to be used to impart an assist force or counterforce to the operation of the joystick lever 24.

3-4

The wheel loader 1 (an example of a work vehicle) in this embodiment further comprises the torque sensor 103 and the controller 28. The torque sensor 103 senses the torque generated by the operation of the joystick lever 24 (an example of an operation member). As shown in FIG. 9A, the controller 28 controls the electric motor 111 on the basis of the sensed value from the torque sensor 103.

Consequently, a force can be imparted according to the torque exerted by the operator on the joystick lever 24. For instance, the amount of force imparted is controlled so that when the torque exerted by the operator on the joystick lever 24 is high, the assist force imparted by the force imparting component 27 is increased, and when the torque is low, the assist force is reduced.

3-5

With the wheel loader 1 (an example of a work vehicle) in this embodiment, the pilot valve 42 (an example of a control valve) has the operation input shaft 61 (an example of a first input member), the feedback input shaft 62 (an example of a second input member), the first spring 64 (an example of a biasing component), and the second spring 65 (an example of a biasing component). The operation input shaft 61 is linked to the joystick lever 24 (an example of an operation member) and is displaced according to the operation angle θin (an example of an operation amount) of the joystick lever 24. The feedback input shaft 62 is displaced according to the steering angle θs. The first spring 64 and the second spring 65 bias the operation input shaft 61 so as to attain the neutral position Np, in which the rotational angle θin (an example of a displacement amount) of the operation input shaft 61 matches the amount of displacement of the rotational angle θfb (=θs) of the feedback input shaft 62.

Consequently, after the joystick lever 24 is operated, the steering angle θs changes so as to follow the joystick lever 24, and the pilot valve 42 goes into the neutral position Np when the steering angle θs matches the operation angle θin (an example of an operation amount) of the joystick lever 24.

The first spring 64 and the second spring 65 are thus provided to the pilot valve 42 (an example of a control valve), and the operator operates the joystick lever 24 at an operation force that resists the biasing force of the first spring 64 and the second spring 65. An assist force or a counterforce can be imparted to this operation against the biasing force.

3-6

The wheel loader 1 (an example of a work vehicle) in this embodiment further comprises the controller 28. As shown in FIG. 10A, the controller 28 controls the force imparting component 27 according to the difference α between the rotational angle θin (an example of a displacement amount) of the operation input shaft 61 (an example of a first input member) and the rotational angle θfb (=θs) (an example of a displacement amount) of the feedback input shaft 62 (an example of a second input member).

Consequently, the force imparting component 27 can be controlled according to the difference between the steering angle θs and the operation angle θin of the joystick lever 24. For instance, the recoil to which the wrist is subjected at catch-up can be mitigated by imparting a counterforce ahead of the catch-up angle.

3-7

The wheel loader 1 (an example of a work vehicle) in this embodiment further comprises the steering valve 32. The steering valve 32 adjusts the flow of fluid supplied to the steering cylinders 21 and 22 (an example of a hydraulic actuator) on the basis of the pilot pressure inputted from the pilot valve 42 (an example of a control valve). The pilot valve 42 controls the flow of fluid supplied from the steering valve 32 to the steering cylinders 21 and 22 by adjusting the pilot pressure.

Consequently, the pilot pressure is adjusted depending on the operation by the operator, the amount of fluid supplied from the steering valve 32 to the steering cylinders 21 and 22 is controlled, and the steering angle θs of the front frame 11 with respect to the rear frame 12 is changed.

3-8

With the wheel loader 1 in this embodiment, the joystick lever 24 is linked to the pilot valve 42.

This allows the steering angle θs to be changed when the operator operates the joystick lever 24.

Also, when V shape loading is performed by a wheel loader (an example of a working vehicle), the amount of operation when using the joystick lever 24 will be less than using a steering wheel, which reduces the burden on the operator.

Other Embodiments

An embodiment of the present invention was described above, but the invention is not limited to or by the above embodiment, and various modifications are possible without departing from the gist of the present invention.

(A) In the above embodiment, the configuration was such that the amount of fluid supplied from the steering valve 32 to the steering cylinders 21 and 22 was controlled according to the pilot pressure inputted from the pilot valve 42 (an example of a control valve), but the configuration may instead be such that the fluid from the pilot valve 42 is supplied directly to the steering cylinders 21 and 22.

(B) In the above embodiment, two springs were provided, namely, the first spring 64 and the second spring 65, but the second spring 65 need not be provided. In this case, for example, the part between the feedback spool 73 and the feedback sleeve 74 should be fixed.

(C) In the above embodiment, the joystick lever 24 was used as an example of an operation member, but this is not the only option. For example, the operation member may be a steering wheel or the like, as long as it is linked to the pilot valve 42.

(D) In the above embodiment, the pilot valve 42 was a rotary type, but this is not the only option. Furthermore, there may be no linking mechanism 26, and the pilot valve 42 may be an Orbitrol (trade name) or the like.

(E) Also, in the above embodiment, the force imparted to the input shaft 81b by the force imparting component 27 was controlled on the basis of the torque or angular deviation α, but the force imparting component 27 may be controlled on the basis of the value of the vehicle speed sensor 105. For example, control may be performed to improve operability by raising the assist force when the speed is low (such as less than 15 km/hour). Or, control may be performed to reduce the assist force or add a counterforce when the speed is high (such as from 25 km/hour or higher to 40 km/hour or lower). Furthermore, the assist force or counterforce may be varied continuously or in steps based on the change in speed.

(F) In the above embodiment, a force was generated by the electric motor 111, but an electric motor is not the only option, and may be a hydraulic motor or the like. In other words, it may be any actuator or the like with which the force to be imparted can be generated.

(G) In the above embodiment, as shown in FIG. 5, the force imparting component 27 and the torque sensor 103 were provided to the steering operation shaft 81 disposed between the universal joint 83 and the joystick lever 24, but may instead be provided between the universal joint 83 and the pilot valve 42. In other words, they may be provided between the joystick lever 24 and the pilot valve 42.

Figure 11:
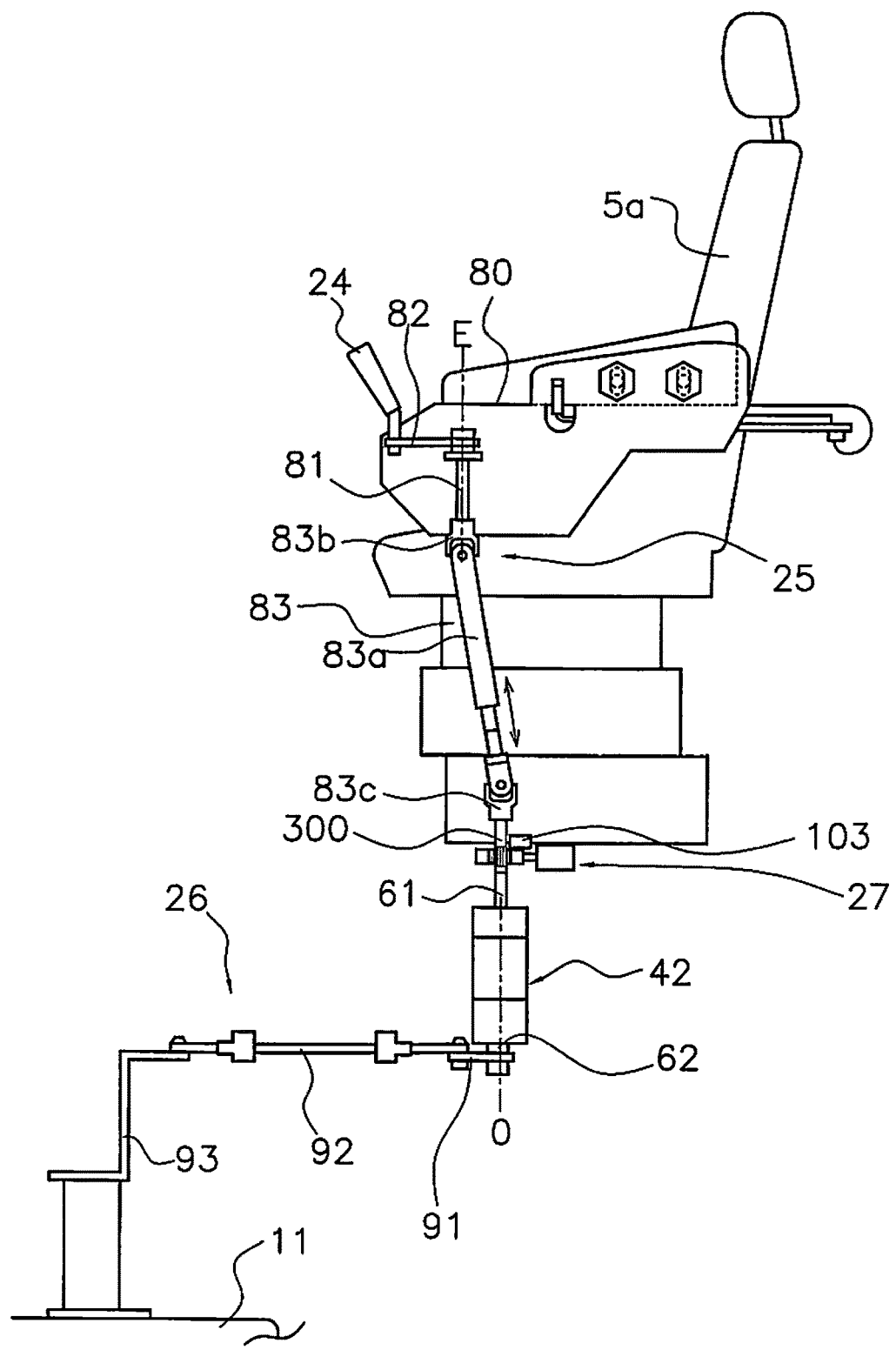
FIG. 11 is a side view showing the arrangement of the force imparting component in a modification example of an embodiment of the present invention.

FIG. 11 shows a configuration in which the force imparting component 27 and the torque sensor 103 are disposed between the universal joint 83 and the pilot valve 42. As shown in FIG. 11, an input shaft 300 is provided that connects the operation input shaft 61 of the pilot valve 42 with the joint portion 83c of the universal joint 83. A torque sensor 103 is provided to the input shaft 300. Also, the worm wheel 112b shown in FIG. 8 is provided to the input shaft 300. In this case, the steering operation shaft 81, the universal joint 83, and the input shaft 300 shown in FIG. 11 correspond to an example of a link.

(H) In the above embodiment, the drive circuit 204 was included in the controller 28, but need not be included in the controller 28, and just the drive circuit 204 may be mounted by itself. Furthermore, the drive circuit 204 may be mounted to an electric motor.

(I) In the above embodiment, the wheel loader 1 was given as an example of a work vehicle, but a wheel loader is not the only option, and may instead be an articulated dump truck, motor grader, or the like, so long as it is an articulated work vehicle.

The work vehicle of the present invention has the effect of allowing the tactile sensation experienced by the operator to be improved, and is useful in a wheel loader or the like.

The invention claimed is:

1. A work vehicle, the work vehicle being articulated with a front frame and a rear frame linked to the front frame, the work vehicle comprising:
a hydraulic actuator configured to be hydraulically driven and to change a steering angle of the front frame with respect to the rear frame;
a control valve configured to control flow of fluid supplied to the hydraulic actuator;
an operation member linked to the control valve and configured to be operated by an operator; and
a force imparting component configured to impart an assist force or a counterforce to an operation of the operation member, the force imparting component including an electric motor as a drive source thereof.

2. The work vehicle according to claim 1, further comprising
a link linking the operation member and the control valve,
the force imparting component further including a transmission mechanism configured to transmit the assist force or counterforce to the link.

3. The work vehicle according to claim 1, further comprising
a torque sensor configured to sense torque produced by operation of the operation member; and
a controller configured to control the electric motor based on a sensed value of the torque sensor.

4. The work vehicle according to claim 1, wherein the operation member is a joystick lever.

5. The work vehicle according to claim 2, wherein the operation member is a joystick lever.

6. The work vehicle according to claim 3, wherein the operation member is a joystick lever.

7. A work vehicle, the work vehicle being articulated with a front frame and a rear frame linked to the front frame, the work vehicle comprising:
a hydraulic actuator configured to be hydraulically driven and to change a steering angle of the front frame with respect to the rear frame;
a control valve configured to control flow of fluid supplied to the hydraulic actuator;
an operation member linked to the control valve and configured to be operated by an operator; and
a force imparting component configured to impart an assist force or a counterforce to an operation of the operation member, the control valve including
- a first input member linked to the operation member and displaced according to an amount of operation of the operation member,
- a second input member displaced according to the steering angle, and
- a biasing component biasing the first input member to a neutral position at which an amount of displacement of the first input member matches an amount of displacement of the second input member, the control valve controlling flow of fluid supplied to the hydraulic actuator according to a difference between the amount of displacement of the first input member and the amount of displacement of the second input member, and the operation member being operated against biasing force produced by the biasing component.

8. The work vehicle according to claim 7, further comprising
- a controller configured to control the force imparting component according to the difference between the amount of displacement of the first input member and the amount of displacement of the second input member.

9. The work vehicle according to claim 7, further comprising
- a steering valve configured to adjust flow of fluid supplied to the hydraulic actuator based on a pilot pressure inputted from the control valve,
- the control valve controlling the flow of fluid supplied from the steering valve to the hydraulic actuator by adjusting the pilot pressure.

10. The work vehicle according to claim 7, wherein the operation member is a joystick lever.

11. The work vehicle according to claim 8, wherein the operation member is a joystick lever.

12. The work vehicle according to claim 9, wherein the operation member is a joystick lever.

* * * * *